(12) United States Patent
Madnani

(10) Patent No.: US 7,921,176 B2
(45) Date of Patent: Apr. 5, 2011

(54) MECHANISM FOR GENERATING A COMPOSITE EMAIL

(76) Inventor: Rajkumar R. Madnani, New York, NY (US)

( * ) Notice: Subject to any disclaimer, the term of this patent is extended or adjusted under 35 U.S.C. 154(b) by 570 days.

(21) Appl. No.: 11/805,636

(22) Filed: May 23, 2007

(65) Prior Publication Data
US 2008/0162651 A1 Jul. 3, 2008

Related U.S. Application Data

(60) Provisional application No. 60/878,237, filed on Jan. 3, 2007.

(51) Int. Cl.
G06F 15/16 (2006.01)
(52) U.S. Cl. .................. 709/207; 709/206
(58) Field of Classification Search .......... 709/206, 709/207; 715/752, 758
See application file for complete search history.

(56) References Cited

U.S. PATENT DOCUMENTS

| 6,122,632 | A  | * | 9/2000  | Botts et al. ............ 707/10 |
| 6,427,164 | B1 | * | 7/2002  | Reilly ................. 709/206 |
| 6,484,196 | B1 |   | 11/2002 | Maurille |
| 6,496,853 | B1 |   | 12/2002 | Klein |
| 6,553,407 | B1 |   | 4/2003  | Ouchi |
| 6,631,398 | B1 |   | 10/2003 | Klein |
| 6,816,884 | B1 |   | 11/2004 | Summers |
| 6,941,304 | B2 | * | 9/2005  | Gainey et al. .......... 707/10 |
| 6,968,362 | B2 |   | 11/2005 | Koch et al. |
| 7,082,458 | B1 | * | 7/2006  | Guadagno et al. ....... 709/204 |
| 7,113,979 | B1 | * | 9/2006  | Smith et al. ........... 709/217 |
| 7,181,495 | B2 |   | 2/2007  | Skladman et al. |
| 7,490,050 | B2 | * | 2/2009  | Grover et al. .......... 705/4 |
| 7,552,178 | B2 | * | 6/2009  | Chen et al. ............ 709/206 |
| 7,596,594 | B2 | * | 9/2009  | Karp .................. 709/203 |
| 7,716,593 | B2 | * | 5/2010  | Durazo et al. .......... 715/752 |
| 7,730,113 | B1 | * | 6/2010  | Payette et al. ......... 707/821 |
| 2003/0101065 | A1 |   | 5/2003  | Rohall et al. |
| 2003/0163537 | A1 |   | 8/2003  | Rohall et al. |
| 2004/0054737 | A1 | * | 3/2004  | Daniell ............... 709/206 |
| 2004/0119740 | A1 |   | 6/2004  | Chang et al. |
| 2004/0186762 | A1 |   | 9/2004  | Beaven et al. |

(Continued)

FOREIGN PATENT DOCUMENTS
EP 1 718 015 A 11/2006
(Continued)

OTHER PUBLICATIONS

Partial International Search Report, PCT application No. PCT/US2007/087375 dated Jun. 27, 2008 (4 pgs).

(Continued)

Primary Examiner — Ario Etienne
Assistant Examiner — Sargon N Nano
(74) Attorney, Agent, or Firm — Hickman Palermo Truong & Becker LLP

(57) ABSTRACT

A mechanism is disclosed for generating a composite email for an email conversation. The composite email includes content automatically extracted from a plurality of the emails in the email conversation, and may be generated in response to a user accessing just one of the emails in the email conversation. A mechanism is also disclosed for discovering and recovering lost emails in an email conversation. A mechanism is further disclosed for automatically moving emails from one container to another after an email has been read. These and other advantageous email generating, manipulation, and organization mechanisms are disclosed herein.

70 Claims, 7 Drawing Sheets

U.S. PATENT DOCUMENTS

| | | | |
|---|---|---|---|
| 2004/0210587 A1 | 10/2004 | Reysa | |
| 2004/0254998 A1* | 12/2004 | Horvitz | 709/206 |
| 2005/0033811 A1 | 2/2005 | Bhogal et al. | |
| 2005/0033813 A1 | 2/2005 | Bhogal et al. | |
| 2005/0091328 A1* | 4/2005 | Saeidi | 709/206 |
| 2005/0108402 A1 | 5/2005 | Colson et al. | |
| 2005/0144571 A1 | 6/2005 | Loverin et al. | |
| 2005/0234850 A1 | 10/2005 | Buchheit et al. | |
| 2005/0262203 A1 | 11/2005 | Buchheit et al. | |
| 2006/0010217 A1 | 1/2006 | Sood | |
| 2006/0031324 A1 | 2/2006 | Chen et al. | |
| 2006/0075040 A1* | 4/2006 | Chmaytelli | 709/206 |
| 2006/0085502 A1 | 4/2006 | Sundararajan et al. | |
| 2006/0143274 A1 | 6/2006 | Schulz et al. | |
| 2006/0173824 A1* | 8/2006 | Bensky et al. | 707/3 |
| 2006/0206526 A1* | 9/2006 | Sitomer | 707/104.1 |
| 2006/0239221 A1* | 10/2006 | Burns et al. | 370/328 |
| 2006/0271630 A1 | 11/2006 | Bensky et al. | |
| 2007/0005715 A1 | 1/2007 | LeVasseur et al. | |
| 2007/0005807 A1 | 1/2007 | Wong | |
| 2007/0038710 A1 | 2/2007 | Li et al. | |
| 2007/0233789 A1 | 10/2007 | Agarwal et al. | |
| 2007/0271345 A1 | 11/2007 | Callanan et al. | |
| 2008/0046518 A1 | 2/2008 | Tonnison et al. | |
| 2008/0183834 A1 | 7/2008 | Halcrow et al. | |
| 2008/0209309 A1* | 8/2008 | Zhang et al. | 715/205 |
| 2009/0100009 A1* | 4/2009 | Karp | 707/3 |
| 2009/0110159 A1 | 4/2009 | Kalbag | |
| 2010/0095224 A1* | 4/2010 | Yozell-Epstein et al. | 715/752 |
| 2010/0174799 A1* | 7/2010 | Hewitt et al. | 709/206 |
| 2010/0192072 A1* | 7/2010 | Spataro et al. | 715/753 |
| 2010/0211889 A1* | 8/2010 | Durazo et al. | 715/752 |

FOREIGN PATENT DOCUMENTS

| | | |
|---|---|---|
| WO | WO 99/04347 A | 1/1999 |
| WO | WO/ 2005/098701 A2 | 10/2005 |
| WO | WO 2006/039417 A | 4/2006 |
| WO | WO 2006/083793 A | 8/2006 |

OTHER PUBLICATIONS

Current claims in PCT application No. PCT/US2007/087375 (24 pgs).

International Search Report, PCT Application No. PCT/US2007/087375, dated Oct. 15, 2008, (9 pgs).

Written Opinion of ISR, PCT Application No. PCT/US2007/087375, (10 pgs).

Blackwell, Elizabeth, "Cutting Down on Email", The Wall Street Journal Online, dated Oct. 10, 2006, 1 page.

Totty, Michael, "Letter of the Law", The Journal Report: Technology, The Wall Street Journal Online, dated Mar. 26, 2007, 4 pages.

Totty, Michael, "Rethinking the Inbox", The Journal Report: Technology, The Wall Street Journal Online, dated Mar. 26, 2007, 5 pages.

Guth, Robert, "Trolling the Web for Free Labor, Software Upstarts Are New Force", Virtual Piecework, The Wall Street Journal Online, dated Nov. 13, 2006, 7 pages.

Harkins, Susan Sales, "10 tricks for working more efficiently in Mocrosoft Outlook", Version 1.0, Tech Republic, Copyright CNET Networks, Inc., dated Feb. 23, 2007, 5 pages.

Boyce, Jim, "10 key enhancements in Outlook 2007", Version 1.0, Tech Republic, Copyright CNET Networks, dated May 10, 2007, 4 pages.

Google, "About Gmail", Google Gmail, 2007, retrieved from website: < http://mail.google.com/mail/help/intl/en/about.html >, 3 pages.

IBM, "IBM business collaboration software- Lotus Domino", IBM, retrieved from website: < http://www-306.ibm.com/software/lotus/products/domino/ >, printed on Dec. 6, 2007, 1 page.

IBM, "IBM Lotus Notes® software", Copyright IBM Corporation, 2007, retrieved from website: ftp://ftp.software.ibm.com/software/lotus/pub/lotusweb/product/domino/ND8Brochure.pdf , 4 pages.

IBM, "What's new in IBM Lotus Notes and Lotus Domino 8 software", Copyright IBM Corporation, 2007, retrieved from website: ftp://ftp.software.ibm.com/software/lotus/lotusweb/product/domino/New-in-ND8.pdf 12 pages.

Wikipedia, "Comparison of e-mail clients", Wikipedia, the free encyclopedia, retrieved from website: < http://en.wikipedia.org/wiki/Comparison_of_e-mail clients >, printed Dec. 6, 2007, 14 pages.

Wikipedia, "comparison of webmail providers", Wikipedia, the free encyclopedia, retrieved from website: < http://en.wikipedia.org/wiki/Comparison_of_webmail providers >, printed Dec. 6, 2007, 4 pages.

U.S. Appl. No. 11/820,708, filed Jun. 19, 2007, Office Action, Jan. 21, 2010.

* cited by examiner

FROM: —212                          202
MAIN SUBJECT: —214
DATE & TIME SENT: —216

TO:                                 206
o [USER ENTRY]

SUBJECT, SUB HEADINGS:              204 o [USER ENTRY]

208
o [USER ENTRY]

CC:
o [USER ENTRY]

BCC:
o [USER ENTRY]

ATTACHMENTS:                        210

302
From: Rhonda@Salescorp.com
Main Subject: Annual Sales Conference-June 28-30, 2007
Date & Time: November 1, 2007    9:30 am EST

304
*Rhonda    Nov 1*
  Examine & compare: City, Hotel, Costs
  (Chris to Finalize by Nov 15)

*Rhonda    Nov 15*
  Prepare Conference Agenda, And Spouse Activities
  (Mary, tentative by 11/30)

*Mary    Nov 29*
  Review Preliminary Agenda, And Prelim Spouse
  Activity List (see attach 2)

o [USER ENTRY]

308
*Rhonda    Nov 1*
  Hi Folks: Remember last year's great do in NYC? This ones
  going to be better! Send your suggestions quickly to Chris.
       (Participants exchange many emails, Nov 1 to Nov 10,
                            not shown here)

*Chris    Nov 10*
  Thanks for all the ideas. It comes down to these two: The Hyatt
  or the Marriot. I'll check on their rates and meeting facilities
  and get back to you all soon!

*President Bob    Nov 11*
  Chris, keep in mind Hyatt gives us a Corporate rate

*Controller    Nov 11*
  Chris, have Hyatt quote from Contract no: kk-6789,
  Jan 06 for additional discounts.

*Chris    Nov 12*
  I contacted Hyatt - the contract does not apply to conferences.

*Controller    Nov 13*
  Chris, they are right. Negotiate on your own, contract does not apply.

*Patrick, Regional Mgr    Nov 13*
  Hey Chris, I was at Hyatt a few months ago, their rooms were nice
  and new. And, they are 1/2 mile from Main Street's night-cool. Marriot
  is 12 miles away - not cool.

*Rhonda    Nov 15*
  Hi all! Chris and I made a presentation to President Bob yesterday with
  all the costs and figures. Hyatt it is! All details of Hyatt-location, flights
  in and out of the airport, maps, hotel visuals, activities, nightlife, all are
  in Attachment 1. Aloha!
       (Participants exchange many emails, Nov 16 to Nov 29,
                            not shown here)

*Mary    Nov 29*
  Hi all! I've incorporated all your comments of the last ten days,
  and more importantly, the carry-over agenda from last year's
  conference. please review attachment 2. Give your comments
  asap, this goes to the Board 12/20.

o [USER ENTRY]

306
TO:
Mary
Chris
President Bob
Controller
Assistant Controller
VP USA
VP Canada
VP South Amercia
Regional Managers List 20
VP Public Relations
VP Corporate Affairs
VP HR
Assistant VP HR o [USER ENTRY]

CC:
CEO Gary
Exec Assistant to CEO
Exec Assistant to Chairman o [USER ENTRY]

BCC:

o [USER ENTRY]

. . .

310
ATTACHMENTS:

File 1: Location info
(sent by Rhonda 11/15)

File 1: Location info
(sent by Rhonda 11/16)

File 2: Conference: Prelim.
Agenda & Activities
(sent by Mary 11/29)

501 __ Inbox (n)
502 _____|
  503 __ Conversation Email (n)
  502 _____|
    504 __ Regular Email (n)
    502 _____
505 _____

| IMPORTANT NEW MAIL (n) |
| --- |
| *President (n) Company Email (n) Family (n)* |

506 __ Conversation Email
  507 _____ General Folder (n)
  508 _____ CC Folder (n)
  509 _____ Named Folder 1 (n)
  510 _____ Named Folder 2 (n)
  511 _____ ... ...
  512 _____ Named Folder ... (n)
  513 _____ Drafts
  514 _____ Forwards
  515 _____ Deleted (n) [Empty]
516
  517 ——

| MY REMINDERS (n) | | | |
| --- | --- | --- | --- |
| Heading 1 (n) | Heading 2 (n) | · · · | Heading m (n) |
| [#] | [#] | · · · | [#] |
| · | · | | · |
| · | · | | · |
| · | · | | · |
| [#] | [#] | · · · | [#] |

518 _____ General Folder (Archive)
  519 _____ CC Folder (Archive)
  520 _____ Named Folder 1 (Archive)
  521 _____ Named Folder 2 (Archive)
  522 _____ ... ...
  523 _____ Named Folder ... (Archive)
524 __ Bulk Mail
  525 _____ Notable (n) [Empty]
  526 _____ All Other (n) [Empty]
527 __ Regular Mail (n)
  528 _____ Current (n)
  529 _____ Sent
  530 _____ Drafts
  531 _____ Deleted (n) [Empty]
  532 _____ Folders
    533 _____ Name 1 (n)
    534 _____ Name 2 (n)
    522 _____ ... ...
    536 _____ Name ... (n)

*Fig. 5*

MECHANISM FOR GENERATING A COMPOSITE EMAIL

PRIORITY CLAIM

This application claims the benefit of U.S. Provisional Application Ser. No. 60/878,237, entitled "SYSTEM AND METHOD FOR AN EMAIL MANAGEMENT SYSTEM THAT REDUCES THE CLUTTER OF REPETITION OF EMAILS IN FOLDERS AS WELL AS IN EMAIL CONTENT, PROVIDES FEATURES THAT FACILITATE COLLABORATION BY EMAIL COMMUNICATION, AND PROVIDES FOR WAYS TO USE EMAIL CONTENT IN MEANINGFUL WAYS", filed on Jan. 3, 2007, by Rajkumar R. Madnani. The entire contents of the above-referenced application are hereby incorporated by reference.

BACKGROUND

Electronic mail (hereinafter "email") has become one of the most widely used communication tools in the world. Most people use email systems at their workplace and at home, and with the increasing number of emails sent and received, the shortcomings of existing email systems are becoming clear.

One drawback to existing email systems is that managing emails, new incoming and new outgoing, and their subsequent replies and forwards, is increasingly difficult with the growing volumes of emails, and more often than not leads to cluttered inbox, sent, and deleted folders. The inbox folder often becomes cluttered because emails, new incoming emails as well as previously read emails, are stored in the inbox folder until a user manually moves the emails out of it. Emails get cluttered in the sent folder because new emails sent out by the user are stored in the sent folder, and replies and forwards sent by the user to others are also stored in the sent folder.

Over time, the clutter keeps increasing, and it is quite common for users to have hundreds of emails sitting in the inbox, sent mail, and other named folders. It takes considerable effort to move and keep moving the emails into other named folders, to keep the clutter from growing. As the emails are moved into named folders, the named folders themselves get cluttered with repetitive emails. The user is afraid to delete any email (in inbox, sent or named folders) for fear of losing something important, and because of time constraints is unlikely to sift through these emails in order to reduce their redundancy.

While each email does contain some new data in the form of the latest email message, it likely contains a repetition of earlier emails as an appendix, which may be in the form of "quoted" text continuing after the new message or in the form of a separate file attached to the email. When the number of participants in an email increases, the potential for clutter increases very rapidly and in direct proportion to the increase in number of participants. Some users may spend the time and effort to move emails on a particular subject, or grouping, into specific named folders, reducing the amount of clutter in the inbox, sent and deleted folders, but many or even most do not.

Another drawback to current email management approaches is that identifying, extracting and using data residing in emails can get extremely cumbersome because the data may be resident in conceivably twenty, thirty, forty or more than a hundred emails on a particular subject. These emails may also reside in different folders, such as the inbox, sent and other named folders, and possibly in the deleted folder too. It can become impenetrable, if the need for data tucked away in various emails arises after several days when one's memory may not be as sharp, or if data is contained in emails with several subject headings. Information on a particular topic cannot be easily collated from various emails, and printing the various emails for a hard copy reference is a voluminous job with diminishing utility as the number of emails grows.

In general, current approaches provide two ways to meaningfully use the data contained in multiple emails. One way is to highlight the required text, a few words or several lines at a time, in an email that is open on the user's screen, and copy it into another document (word processing or email or other), and then to repeat this process over several emails. Another way is to create an exported output of the email into a file, instead of paper, and then use the output of the resulting file in another document which may be a word processing document, or an email or some other document, and then to repeat this process over several emails.

Many email management systems provide search facilities to identify the emails that may contain specified words or phrases. The search result identifies the emails that satisfy the specified search criteria. But once the emails have been identified, either by manually going through several emails, or by the quicker search routines, the problem of extracting the data and using it from the several identified emails remains. The problem can be partially addressed by going into each email, one at a time, and using one of the two ways described above, highlighting or using an export function to create an output file, to extract and use the data. As the number of emails increases, so does the effort. These limitations, combined with the clutter of large numbers of emails, make it extremely difficult to use the data from the emails in a meaningful manner.

Another drawback to current approaches is that data is repeated over and over in replies and forwards, both sent and received, using valuable disk space. Additionally, particularly at the corporate or enterprise level, backups and historical records maintenance become more cumbersome and costly. The extent of data repetitiveness in emails, and redundancy due to multiplicity of mostly identical emails, can be quite a serious problem in terms of how much storage space is used for periodic backups as a security measure and for archiving, tasks which may be statutory requirements for many companies. If multiple copies of emails are eliminated or avoided in backups, it may be possible to reduce the manpower and memory requirements of email backups and archiving.

Another drawback to current approaches is that as users keep sending and receiving emails, the subject of the emails evolves, but emails are sent using the same subject heading. Sometimes a subject heading may be changed to reflect a new evolved status of the old subject, but the content of old as well as new subjects may continue under the new subject heading. In essence, the current system of emails allows a subject heading, but does not allow any organized way of enforcing that subject heading (i.e. limiting the discussion to that subject heading).

Current email management approaches have no organized way to manage subject headings as they evolve or change into subheadings. In one case, the subject heading does not change, but the content of emails may be on revised but related subjects (evolution of the original subject), thus making data collection and analysis from emails even more difficult than already described. In another case, the subject heading changes to reflect an evolution from the original subject, but some email users may continue to send text based on the old subject but use the new subject headings, thus once again making it difficult to delete or organize the emails.

Another drawback to current approaches occurs when the subject itself does not evolve, but there is simply a natural passage of time. Current approaches do not permit a systematic way to continue emails on an old subject after a period of absence of emails on the subject. If a user receives an email on an old subject after a long break, the potential for the email containing one or more of the following is rather high: the sender may fail to append older emails exchanged on that topic (i.e. a new email instead of a reply/forward to an older email on the subject), or fail to write the same subject in the subject line, or worse, send an appendix of other irrelevant emails while sending the email on the subject. Currently, the user has to review the clutter of emails in various folders to obtain a history of that subject. This makes it very difficult for the user to ascertain the context behind the new message. Thus, the new message may be difficult to understand.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

In accordance with one embodiment of the present invention, there is provided a mechanism for generating a composite email. As used herein, the term "composite email" refers to a set of information that includes content automatically extracted from a plurality of individual emails. With this mechanism, it is possible for a user to view content from multiple emails without having to manually open and extract content from each of those emails.

In one embodiment, when an initial email pertaining to a particular topic or subject is sent to start an email conversation, a unique identifier is associated with that email. All subsequent emails in that email conversation (e.g. responses to the initial email, response to responses to the initial email, etc.) will also carry that unique identifier. Thus, the unique identifier associates the various emails with each other so that they can be treated as being part of the overall email conversation.

In one embodiment, when any email in an email conversation is accessed by a user, the mechanism extracts the unique identifier from that email. The mechanism also extracts content from that email. Based at least partially upon the unique identifier, the mechanism accesses an email conversation data structure that is associated with the email conversation. This email conversation data structure contains information indicating which emails are part of the email conversation. The mechanism selectively accesses one or more of the emails that are indicated by the email conversation data structure as being part of the email conversation, and extracts content from those one or more accessed emails. The mechanism then automatically generates or composes a composite email. The mechanism includes in this composite email the content extracted from the email that is being accessed by the user and the content extracted from the one or more accessed emails. This composite email may then be displayed to the user. By performing the processing discussed above, the mechanism enables the user to easily view the contents from several or all of the emails in the email conversation without having to manually search for each email, manually open each email, and manually extract information from each email. Thus, viewing the contents of multiple emails in an email conversation is made quite simple. In one embodiment, none of the emails in the email conversation contain repeated text that is copied from previous emails in the email conversation (e.g. if an email is a reply to a previous email, it does not contain a copy of the text in the previous email; rather, the reply includes just the new text entered by the sender of the reply); thus, none of the emails in the email conversation contain redundant content. Because of this, the content that is extracted from the various emails and included in the composite email is inherently non-redundant.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 shows a sample user interface that is provided by one embodiment of the present invention to enable a user to create an initial email of an email conversation.

FIG. 3 shows a sample user interface provided by one embodiment of the present invention in which a composite email may be displayed.

FIG. 5 shows a sample display of containers that a user may see when a user accesses his/her email account, wherein the containers may be used to store various emails in the email account.

DETAILED DESCRIPTION OF EMBODIMENT(S)

Figure 1A:
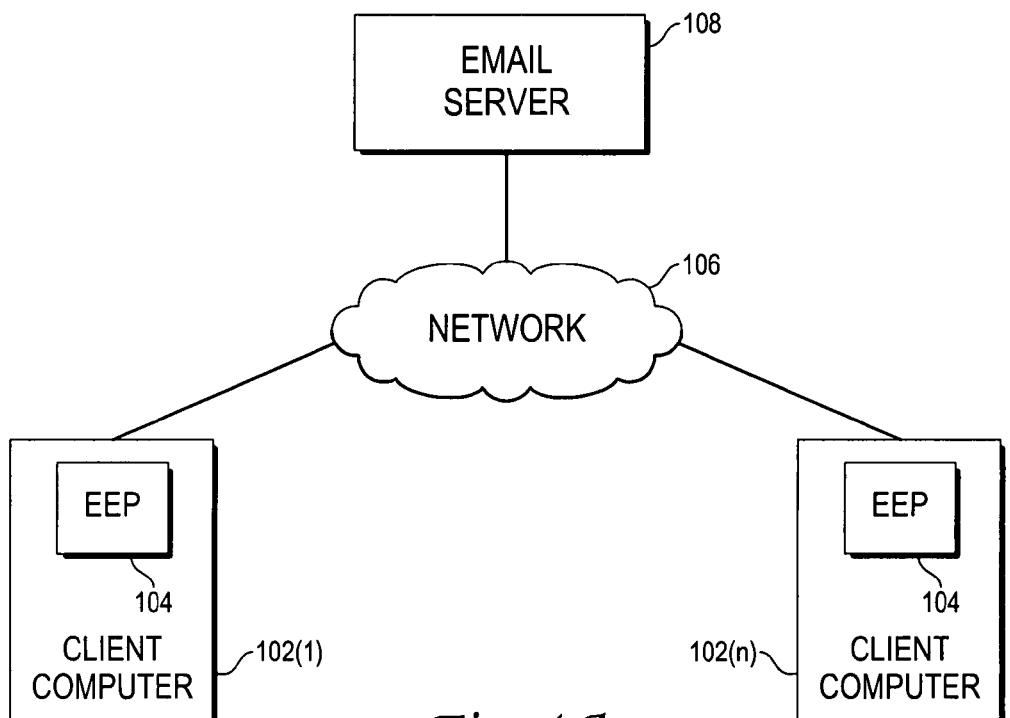
FIGS. 1A and 1B show sample systems in which one embodiment of the present invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

One embodiment of the present invention enables email to be used to emulate a conversation or meeting. To start the conversation or meeting (hereinafter, just conversation for the sake of brevity), a user sends an initial email to a set of participants. This initial email sets forth a particular topic for discussion. Thereafter, the participants may provide input on the topic by sending response emails, with each response email containing a set of new content. Current email systems are capable of providing what has been described thus far. What they are missing, however, is the ability to relate the various emails in such a way that they resemble a coherent conversation. Currently, email systems treat each email as a separate entity, indicating by a "RE" or a "FWD" preceding the subject that the email is a reply or a forwarded email, and there is no way to automatically relate one email to another.

Thus, in order to see all of the response to the initial email, a user has to find each of the response emails, and open each to view the content contained therein. In many instances, there is redundant information in the response (e.g. a reply may have the content from previous replies appended to it); thus, the user has to further sift through the response to find the new content.

To make the overall exchange of information more resemble a conversation, an embodiment of the present invention introduces the concept of a "composite email". As used herein, the term composite email refers to a set of information that includes content automatically extracted from a plurality of individual emails. In the context of an email conversation, a composite email would include content extracted from multiple emails in the email conversation. Thus, a composite email may be analogized to a transcript of the email conversation. With such a transcript, it is easy for a user to see what has transpired thus far in the conversation. In one embodiment, a composite email is automatically generated whenever any one of the emails in an email conversation is accessed by a user.

In one embodiment, to make it possible for all of the emails pertaining to an email conversation to be related to one another, a unique identifier is associated with all of the emails. Specifically, in one embodiment, when an initial email is sent by a user (this email is the one that sets forth the particular topic to be discussed in the email conversation, and this user is referred to as the administrator of the email conversation), a unique identifier is generated and associated with the initial email. This unique identifier may be viewed as a conversation identifier for identifying the email conversation that is being started. All subsequent emails in the email conversation (e.g. responses to the initial email, responses to the responses to the initial email, etc.) will also carry that unique identifier. Effectively, the unique identifier relates all of the various emails so that they can be associated with each other. In a sense, the unique identifier ties the various emails together so that they can be treated as being part of the same email conversation.

In one embodiment, the unique identifier comprises a code generated from the administrator's user identification, such as his/her email address, a date and time code, and a sequential counter. The sequential counter may be a counter that keeps track of the number of initial emails that have been sent by this administrator. For example, if the administrator has started six email conversations, and hence, has sent six initial emails, then the sequential counter for the administrator would be six. This means that the next initial email sent by the administrator would have a sequential counter value of seven. In addition, the unique identifier may further comprise a special designation (e.g. UID) to indicate that it is a unique identifier. This is just one way of generating the unique identifier. Many other methodologies may be used. For purposes of the present invention, the unique identifier may be generated using any desired methodology and any type of information. So long as the identifier is unique, it may be used as the unique identifier for an email conversation.

In one embodiment, when any email in an email conversation is accessed by a user, the unique identifier for the email conversation is extracted from that email, and content contained in that email is also extracted. Based at least partially upon the unique identifier, an email conversation data structure that is associated with the email conversation is accessed. This email conversation data structure contains information indicating which emails are part of the email conversation. One or more of the emails that are indicated by the email conversation data structure as being part of the email conversation are accessed, and the contents of those one or more accessed emails are extracted. A composite email is then automatically generated or composed. Included in this composite email are the contents extracted from the email that is being accessed by the user and the contents extracted from the one or more accessed emails. This composite email may then be displayed to the user. By presenting the composite email to the user, it is possible for the user to view, in a single display, the contents from several or all of the emails in the email conversation without having to manually search for each email, manually open each email, and manually extract information from each email. In one embodiment, none of the emails in the email conversation contain repeated text that is copied from previous emails in the email conversation (e.g. if an email is a reply to a previous email, it does not contain a copy of the text in the previous email; rather, the reply includes just the new text entered by the sender of the reply); thus, none of the emails in the email conversation contain redundant content. Because of this, the content that is extracted from the various emails and included in the composite email is inherently non-redundant.

In addition to being used to generate a composite email, the unique identifier may also be used to organize the emails into containers, thereby making emails easier to find. The unique identifier may also be used to enable other advantageous functionalities to be realized. These and other functionalities will be described in detail in later sections.

A mechanism for realizing the functionalities described herein may take on various forms. In one embodiment, the mechanism takes the form of an enhanced email program (EEP) that is executed on one or more client computers in an overall email system. An example of such a system is shown in FIG. 1A, wherein the system comprises a plurality of client computers 102 coupled to an email server 108 via a network 106. One or more of the client computers 102 has an EEP 104 executing thereon. In this embodiment, the EEP 104 on each client computer 102 would implement the functionalities described herein. The email server 108 would simply act as the conduit for transporting emails from one client computer 102 to another. In the system of FIG. 1A, the EEP's 104 would send emails that conform to standard email protocols; thus, even though they have composite email capability, the EEP's 104 can interact with any email server 108 that implements standard email protocols.

Figure 1B:
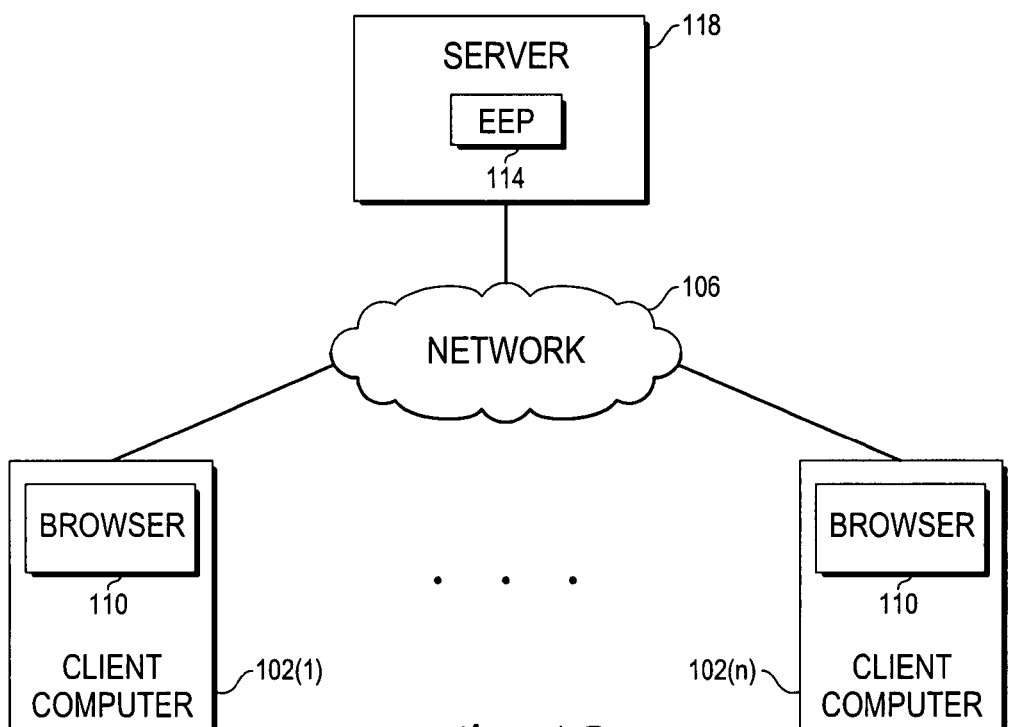

In an alternative embodiment, such as that shown in FIG. 1B, the mechanism may take the form of an EEP 114 that is executed on a server 118. The server 118 may, for example, be a web application server and the EEP 114 may be a web application hosted on that server 118 that is capable of servicing requests from a plurality of client computers 102. To interact with the server 118, each client computer 102 may execute a program such as a browser 110. In this embodiment, the EEP 114 would implement most of the functionalities described herein. The client computers 102 would mainly be responsible for providing a user interface (UI) to users to enable the users to send commands to the EEP 114, and to enable the users to view the content (e.g. the composite email) generated by the EEP 114.

As a variation of the embodiment shown in FIG. 1B, some of the functionalities described herein might not be implemented by the EEP 114 but rather by code executed on the client computers 102. For example, the server 118 may download one or more applets to the client computers 102, and those applets, when executed on the client computers 102, may implement some of the functionalities described herein. Alternatively, the browser 110 may have one or more plugins that, when executed, may implement some of the functionalities described herein.

As a further alternative, each client computer 102 may have a client program (not shown) resident thereon that is designed to interact with the EEP 114 to implement the functionalities described herein (a client-server architecture). The EEP 114 may implement some of the functionalities while the resident program may implement the other functionalities.

Overall, the functionalities described herein may be fully implemented by an EEP 104 executing on a client computer 102, fully implemented by an EEP 114 executing on a server 118, or fully implemented by a combination of an EEP 114 executing on a server and code executing on a client computer, (where each (server and client) implements a subset of the functionalities). All such implementations are within the scope of the present invention.

In the following discussions, the implementation shown in FIG. 1A will be assumed (where the functionalities described herein are implemented by the EEP 104 executed on a client computer 102). However, it should be noted that this is done for simplicity and illustrative purposes only. The invention is not so limited. Given the teachings provided hereinafter, one of ordinary skill in the art can implement the invention in any/all of the arrangements described above with reference to FIGS. 1A and 1B.

Composite Email Description

A composite email may be thought of as a conglomeration of a plurality of individual emails. It is dynamically generated or composed when any one of the emails in an email conversation is accessed/opened. When generated, the composite email includes content/information automatically extracted from one or more of the individual emails in the email conversation. In one embodiment, a composite email is made up of a plurality of parts. These parts include a header portion, one or more text portions, a recipient list portion, a subject subheading portion, and an attachments portion.

The header portion is the part of a composite email that contains general information about the email conversation. In one embodiment, the header portion includes information indicating which participant started the email conversation and hence, is the administrator of the email conversation. This information may include, for example, an email address for the administrator, a user ID, etc. The header portion may also include a date and time at which the email conversation was started (e.g. date and time when an initial email for the email conversation was sent). The header portion may further include a subject for the email conversation. This subject sets forth the overall topic to be discussed in the email conversation. In one embodiment, once set, the information in the header portion cannot be changed.

The text portion is the part of a composite email that contains the text from a particular individual email. If an email conversation comprises a plurality of individual emails, then a composite email may have multiple text portions. For example, if an email conversation includes five individual emails, then the composite email for that email conversation may have five text portions, with each text portion showing the text from a corresponding one of the five individual emails.

The recipient list portion is the part of a composite email that sets forth the participants that are participating in the email conversation. In addition to listing the identifiers (e.g. email addresses) for the participants, the recipient list portion, in one embodiment, may also include other information, such as the authorities that have been given to each participant. For example, some participants may be granted the authority to send replies while others are only given the authority to view emails in the email conversation, some participants may be given the authority to add/amend subject subheadings, some participants may be granted the authority to be a co-administrator to enable those persons to perform some administrative tasks with regard to the email conversation, etc. In one embodiment, the administrator of an email conversation (i.e. the participant who sends out the initial email that starts the email conversation) is the person who sets these authorities. The recipient list and the authorities specified therein may be changed by the administrator and perhaps a co-administrator at a later time. Thus, the recipient list may evolve and change as the email conversation progresses.

The subject subheading (hereinafter, subheading for simplicity) portion is the part of a composite email that sets forth zero or more subheadings for an email conversation. As used herein, the term subheading refers to a sub topic under the general overall subject or topic of an email conversation. For example, if the general subject of the email conversation is "annual sales conference", then a subheading may be "examine and compare city, hotel costs", and another subheading may be "prepare conference agenda". A subheading allows the discussion of the email conversation to be focused. An email conversation, as it progresses, may have multiple subheadings. As one subheading is fully discussed, another subheading may be added. For example, using the above subheadings, once a city and hotel have been selected, the email conversation can proceed to preparing a conference agenda. In one embodiment, multiple subheadings (e.g. all of the subheadings that have ever been added to the email conversation) may be included in a composite email. A subheading is optional, and can be added by a participant having the proper authority.

The attachments portion is the part of a composite email that sets forth the files that are attached to the email conversation. An email conversation may have zero or more attachments, and additional attachments may be added as the email conversation progresses.

In one embodiment, each of these parts of a composite email has the unique identifier of the email conversation associated therewith. This enables the various parts to be associated with the email conversation. This is noteworthy because, in one embodiment, each of these parts is treated separately, and is sent as a separate email. To illustrate this point, reference will be made to the following example.

Suppose that a participant starts an email conversation by preparing an initial email. Suppose that the participant (who is the administrator for this email conversation) includes in this initial email: (1) header information for the email conversation; (2) a text message; (3) a recipient list setting forth the participants for the email conversation; (4) a subheading specifying a first subtopic to be discussed; and (5) an attachment that includes one file. This initial email would also include a unique identifier. In one embodiment, when this initial email is sent out to the participants, it is actually sent out as five separate emails, with one email containing the header information, another email containing the text message, another email containing the recipient list, another email containing the first subheading, and another email containing the attachment. Each of these emails would have the unique identifier associated therewith. When one of the participants receives this initial email, that participant would actually receive five separate emails. When that participant opens any one of the five emails, all five of the emails are opened, and a composite email is generated. This composite email would include a header portion containing the header information for the email conversation, a text portion containing the text message from the administrator, a recipient list portion containing the recipient list, a subheading portion containing the subheading, and an attachments portion containing the attached file (or some information pertaining to the attached file). Thus, the composite email comprises information extracted from each of these individual emails.

In one embodiment, when a participant replies to an email in the email conversation, one or more emails may be sent, depending on what was added/changed by that participant. For example, suppose that a participant does not make any changes to the recipient list, does not add a subheading, and does not add any attachments, but rather simply types in a new text message. In such a case, only one text email containing the new text message would be sent to the other participants in the email conversation (this text email would have the unique identifier associated therewith). Since none of the other parts were updated, there is no need to send any other emails. When another participant (e.g. the administrator) opens this new text email, a composite email is generated. This composite email would include all of the information in the initial email (e.g. header information for the email conversation, administrator's text message, recipient list, subheading, and attachment). In addition, it would include an additional text portion, which would contain the text of the new email.

Suppose now that a participant adds another subheading to the email conversation (assuming that that participant has the authority to do so) and a new attachment. In such a case, another subheading email and another attachment email would be sent out to the participants of the email conversation (both of these emails would have the unique identifier associated therewith). When another participant (e.g. the administrator) opens either of these emails, a composite email is generated. This composite email would include all of the information sent thus far (e.g. header information for the email conversation, administrator's text message, new text message, recipient list, subheading, and attachment). In addition, it would include an additional subheading, which would contain the text of the new subheading, and the new attachment. In one embodiment, a composite email includes all of the subheadings and all of the attachments that have been added to an email conversation thus far.

Suppose further that a participant (e.g. the administrator) alters the recipient list to add a participant, remove a participant, change the authorities given to one or more participants, etc. In such a case, another recipient list email would be sent out (this email would have the unique identifier associated therewith). When another participant opens this new recipient list email, a composite email is generated. This composite email would include most of the information sent thus far (e.g. header information for the email conversation, administrator's text message, new text message, two subheadings, and two attachments). However, instead of the initial recipient list, the composite email would include the new recipient list. In one embodiment, only the most recent recipient list is included in a composite email.

As described above, in one embodiment, each of the parts of a composite email is handled separately, and each is augmented/updated via separate emails (exception: in one embodiment, the header portion cannot be augmented or updated). Each of these emails carries the unique identifier of the email conversation to enable them to be associated with the email conversation. In one embodiment, in addition to carrying the unique identifier, each email (other than the header email) also carries a sub-identifier. The sub-identifier contains information that can be used to uniquely identify each individual email, to distinguish the different types of emails (text, recipient list, subheading, attachment), as well as to provide other useful information.

In one embodiment, a text sub-identifier is included with each text email. In one embodiment, a text sub-identifier comprises an email identifier (e.g. an email address or user ID) for the participant who created and sent that text email, a date and time code, and a sequential counter. In the context of this sub-identifier, the sequential counter indicates how many text emails have been sent by this participant in this email conversation. Thus, if this participant has created and sent two text emails in this email conversation, then the sequential counter value for the first text email would be one, and the sequential counter value for the second text email would be two. The next text email sent by this participant would have a sequential counter value of three. In one embodiment, this sequential counter is maintained separately for each participant. Thus, if another participant has created and sent two text emails in this email conversation, then the sequential counter value for the first text email sent by that participant would be one, and the sequential counter value for the second text email would be two. The above discussion sets forth just one possible method for generating a text sub-identifier. Other methods may be used if so desired. All such methods are within the scope of the present invention.

In one embodiment, a recipient list sub-identifier is included with each recipient list email. In one embodiment, a recipient list sub-identifier comprises a text string (e.g. "recipientlist") indicating that the sub-identifier is a recipient list sub-identifier. The sub-identifier may further include an email identifier (e.g. an email address or user ID) for the participant (presumably the administrator or a co-administrator) who created/updated the recipient list that is contained in the recipient list email. The sub-identifier may further include a date and time code and a sequential counter. In the context of this sub-identifier, the sequential counter indicates how many recipient list emails have been sent by this participant in this email conversation. Thus, if this participant has created and sent two recipient list emails in this email conversation, then the sequential counter value for the first recipient list email would be one, and the sequential counter value for the second recipient list email would be two. In one embodiment, this sequential counter is maintained separately for each participant. Thus, if another participant has created and sent two recipient list emails in this email conversation, then the sequential counter value for the first recipient list email sent by that participant would be one, and the sequential counter value for the second recipient list email would be two. The above discussion sets forth just one possible method for generating a recipient list sub-identifier. Other methods may be used if so desired. All such methods are within the scope of the present invention.

In one embodiment, a subheading sub-identifier is included with each subheading email. In one embodiment, a subheading sub-identifier comprises a text string (e.g. "subheading") indicating that the sub-identifier is a subheading sub-identifier. The sub-identifier may further include an email identifier (e.g. an email address or user ID) for the participant who is adding/updating the subheading that is contained in the subheading email. The sub-identifier may further include a date and time code and a sequential counter. In the context of this sub-identifier, the sequential counter indicates how many subheading emails have been sent by this participant in this email conversation. Thus, if this participant has created and sent two subheading emails in this email conversation, then the sequential counter value for the first subheading email would be one, and the sequential counter value for the second subheading email would be two. In one embodiment, this sequential counter is maintained separately for each participant. Thus, if another participant has created and sent two subheading emails in this email conversation, then the sequential counter value for the first subheading email sent by that participant would be one, and the sequential counter value for the second subheading email would be two. The above discussion sets forth just one possible method for generating a subheading sub-identifier. Other methods may be used if so desired. All such methods are within the scope of the present invention.

In one embodiment, an attachment sub-identifier is included with each attachment email. In one embodiment, an attachment sub-identifier comprises a text string (e.g. "attachment") indicating that the sub-identifier is an attachment sub-identifier. The sub-identifier may further include an email identifier (e.g. an email address or user ID) for the participant who is adding the attachment that is contained in the attachment email. The sub-identifier may further include a date and time code and a sequential counter. In the context of this sub-identifier, the sequential counter indicates how many attachment emails have been sent by this participant in this email conversation. Thus, if this participant has created and sent two attachment emails in this email conversation, then the sequential counter value for the first attachment email would be one, and the sequential counter value for the second attachment email would be two. In one embodiment, this sequential counter is maintained separately for each participant. Thus, if another participant has created and sent two attachment emails in this email conversation, then the sequential counter value for the first attachment email sent by that participant would be one, and the sequential counter value for the second attachment email would be two. The above discussion sets forth just one possible method for generating an attachment sub-identifier. Other methods may be used if so desired. All such methods are within the scope of the present invention.

As will be described in greater detail in a later section, the sequential counter values in the various sub-identifiers may be used to determine whether one or more emails in an email conversation have been lost. For example, if the text sub-identifiers for several text emails sent by the same participant indicate that only text emails having sequence numbers one and three were received, then it is known that the text email sent by that participant having the sequence number two was lost. As will be described in greater detail in a later section, once an email is discovered to have been lost, it can be resent. Thus, lost emails in an email conversation can be recovered.

In the embodiment described above, each sub-identifier includes an indication of an email type (for example, the subheading sub-identifier comprises the text string "subheading", the recipient list sub-identifier comprises the text string "recipientlist", etc.). The absence of any text string in the text sub-identifier implies that it is a text type of email. The sub-identifier also includes a sequential counter value that indicates how many emails of that type have been sent by this participant in this email conversation. These two sets of information are useful in an embodiment where there are different types of emails, as in the embodiment described above. In another embodiment, there may be only one type of email that is exchanged in an email conversation (e.g. the different parts of a composite email may not be separated out into separate emails but rather may be consolidated in a single email). In an embodiment where there is only one type of email, the sub-identifier need not include an indication of email type. Instead, the sub-identifier for an email may comprise just an email identifier (e.g. an email address or user ID) for the participant who sent the email, a date and time code, and a sequential counter. In this embodiment, the sequential counter would indicate how many emails have been sent by this participant in this email conversation (the sequential counter would no longer reflect how many emails of a particular type have been sent by this participant in this email conversation). This and other embodiments are within the scope of the present invention.

Administrator and Participant Authority

The participant who creates the initial email in an email conversation is the administrator of that email conversation. As an administrator, this person has certain default powers related to the email conversation, examples being:
1. Ability to generate and modify the subject subheadings;
2. Ability to change any of the authorities or restrictions set for a participant;
3. Ability to add or remove a participant;
4. Ability to re-send an email, or part of it, using the automatic re-send function (described more fully herein as an automated side mail), or re-send an attachment to a participant who may not have received it or may have difficulty opening an attachment;
5. Ability to partially archive the email conversation for all participants, described more fully herein;
6. Ability to set limits on data entry; for example, setting limits on the entry of text or on parameters of the text (such as number of words, characters or lines) permitted in certain areas such as the subject subheading portion and the text message area;
7. Ability to create fields within which recipients may enter data and send the fields out as replies, which can then be used to create a database for data processing and reporting;
8. Ability to receive data back from every participant, recording the date and time the email was opened, and the date and time the email was replied. The data may also indicate other status items, such as: email not opened and email not replied to. This returned information can be used to prepare a set of status reports, including when the recipients opened their emails and when they sent replies out. These status reports can be viewed in a display on screen, printed, emailed, and exported as an output file in a format used by other software, and are described more fully herein.
9. Ability to allow or disallow the sending of an attachment;
10. Ability to allow or disallow private side mails, described more fully herein, to be sent to any participant. According to an embodiment, automated side mails used for replacing individual emails, subheadings, or attachments not received by a recipient are always permitted;
11. Ability to restrict the reply function to permit replies only to selected users, such as the administrator and certain co-administrators.

In general, the purpose of establishing an administrator with designated powers over a particular email conversation mimics the duties, tasks, responsibilities and powers of a person chairing a meeting. In a meeting, it is the chairperson's responsibility to allow a free flow of ideas and views in an orderly manner, keeping to the agenda and subject on hand, and preventing chaos. Thus, the administrator of an email conversation sets an agenda, provides a focus to the discussion by modifying the subheading being discussed, prevents others from participating if their participation is uncalled for, and harnesses the exchange of views and attachments so that the purpose and agenda are achieved. This allows the administrator to provide a general direction and focus to the exchange of emails. The administrator may share some of the administrator functions and responsibilities with any of the recipients by designating them as co-administrators.

In general, the administrator of an email conversation may grant or restrict any authority to any of the participants of the email conversation. In one embodiment, however, certain administrator powers may not be delegated. For example, only the administrator may be able to nominate or designate a participant as a co-administrator, who in turn would not be allowed to nominate another co-administrator or remove himself from being a co-administrator. As another example, while a co-administrator is permitted to partially archive an email conversation, only an administrator can close an email conversation by fully archiving it, as described more fully herein.

Sample User Interface for Creating an Initial Email

FIG. 2 is a block diagram that illustrates a sample user interface provided by an EEP 104 (FIG. 1A) for enabling an administrator to create an initial email to start an email conversation. FIG. 2 shows five unpopulated panes 202-210. Pane 202 is provided to accommodate header information for the initial email and the email conversation overall. In the pane 202 illustrated in FIG. 2, the "FROM" field 212 contains the administrator's email identification (e.g. email address), which in one embodiment is generated and entered automatically. Pane 202 also comprises a "MAIN SUBJECT" field 214 in which the administrator may specify an overall main topic of discussion for the email conversation. Pane 202 may further comprise a "DATE & TIME SENT" field 216 reflecting the date and time the initial email is sent out. This information may be entered automatically at the time the initial email is sent.

Pane 204 is provided to enable the administrator to optionally enter a subject subheading for the email conversation. When a subheading is entered, it generally indicates a sub topic to be discussed by the email participants and provides a focus to the emails. In an example, a main subject for a group of friends planning a vacation may be: "Our Summer 07 Vacation," and subheadings may be more focused, as in: "Get Dates Confirmed," "Where to Go," and "Making Resort Bookings." After the vacation, example subheadings may be: "Sharing Pictures," "Ideas for Next Year," and so on. All the email participants get to exchange their views on the subheading that is current, providing a focus to the emails, thus, making collaboration and decision making an easier process.

Pane 206 is provided to enable the administrator to enter a recipient list for the email conversation. This list sets forth the participants/recipients who will be participating in the email conversation. Identifiers in the "TO:", "CC:", and "BCC:" sections may be entered by the administrator. For this purpose, the administrator may have access to address books or similar features. Lists comprising several identifiers may also be used. For each identifier entered in the recipient list, the administrator may assign zero or more authorities. Some of the available authorities include but are certainly not limited to: ability to act as a co-administrator, ability to establish/send subheadings, attachments, text emails, etc., ability to send side mails (side mails will be described in a later section), ability to update the recipient list, etc. The administrator may do so, for example, by using a module that becomes available as soon as the recipient's name or email identification is entered or selected. This may be in the form of a pop-up GUI element or similar display element. The administrator may select from predetermined choices for one or more recipients, such as making a recipient a co-administrator, apply a pre-configured default setting to a recipient, or use a previously-applied setting for a recipient. If the administrator selects a recipient as a co-administrator, the administrator may select certain authorities for each co-administrator.

In one embodiment, default configurations may be stored and applied for each recipient in a particular list, such as each recipient in the "To:" list, each recipient in the "CC:" list, each recipient in the "BCC:" list, along with any other participant-designated list that may be available. The administrator may override one or more of the settings for any of the recipients. In one embodiment, if the administrator saves certain settings for a particular recipient, then any time the same recipient appears in the administrator's recipient list for a future email conversation, the participant is offered the choice of accepting the previously saved settings. For example, the administrator may have to send emails to the president of his company on a frequent basis. The president may be listed in the "To:" listing or simply "CC'ed:" on emails. The administrator always wants the president to have full co-administrator privileges for all emails, so this configuration is stored and associated with the company president's identification code or email address so that all future email conversations on which the company president is a recipient will designate the company president as a co-administrator without the administrator having to perform the designation manually each time. The administrator may accept previously saved settings, or make changes to them if desired, with the option of making the changes applicable to the participant thereafter, or making the changes applicable only for the email being formulated. If the administrator does not wish to use default authority settings, he may specify custom authorities for each participant. Overall, the administrator has great freedom in determining what authorities to give to each participant.

Pane 208 is provided to enable the administrator to enter a text message. This text message will be the one that is sent to all of the participants of the email conversation to start the conversation. Finally, pane 210 is provided to allow the administrator to add one or more file attachments to the initial email.

Using the user interface shown in FIG. 2, the administrator can create and define an initial email. When the initial email is completed, the administrator sends it out by selecting a send command (not illustrated). As noted previously, in one embodiment, when the initial email is sent to the participants of the email conversation, a plurality of separate emails are sent. These separate emails may include a header email, a text email, a recipient list email, a subheading email, and an attachment email (note: if no subheading is specified by the administrator, then no subheading email will be sent; likewise, if no attachments are included, then no attachment email will be sent). All of these emails will carry a unique identifier that identifies the email conversation (this unique identifier may be generated by the EEP 104 in the manner previously described). They also will carry a corresponding sub-identifier (e.g. a text email will carry a text sub-identifier, a recipient list email will carry a recipient list sub-identifier, a subheading email will carry a subheading sub-identifier, and an attachment email will carry an attachment sub-identifier). These sub-identifiers may be generated by the EEP 104 in the manner previously described. When these emails are received by a participant who is in an environment with composite email (EEP 104) capability, and when one of the emails is opened, all of the emails having the unique identifier are opened, information is extracted therefrom, and a composite email is generated. The composite email will show all of the information (e.g. header information for the email conversation, text, recipient list, subheading (if any), and attachment (s) (if any)) set forth in the initial email.

Sample Composite Email Display

FIG. 3 shows a sample user interface provided by an EEP 104 in which a composite email may be displayed. In this example, the composite email is generated by extracting content from a plurality of individual emails that are part of an ongoing and fairly mature email conversation. The composite email is generated when any one of the individual emails in the email conversation is opened.

In FIG. 3, the header pane 302 contains the header information for the email conversation, which may include the email address of the administrator of the email conversation, the main subject for discussion as specified by the administrator, and the date and time the initial email was sent. In this example, the administrator is Rhonda.

The example subject subheading pane 304 illustrated in FIG. 3 contains three subheadings. This means that three subheading emails have been sent thus far in this email conversation. On November 1, Rhonda the administrator submitted a subheading entitled "Examine & Compare: City, Hotel, Costs (Chris to Finalize by Nov. 15)." On November 15, Rhonda submitted a second subheading entitled "Prepare Conference Agenda, and Spouse Activities (Mary, tentative by 11/30)." On November 29, a participant named Mary submitted a subheading entitled "Review Preliminary Agenda, and Prelim Spouse Activity List (See Attach 2)." The subheadings in the subheading pane 304 may have been edited by a participant with sufficient authority; for example, the parenthetical at the end of the November 15 subheading ("Mary, tentative by 11/30") may have been added after emails were exchanged, between November 1 and November 15, wherein Mary tentatively agreed to take the described action by November 30. By adding new subheadings and editing subheadings in this manner, the email conversation may be focused and summarized.

The example recipient pane 306 illustrated in FIG. 3 contains three groups of recipients: "To:," "CC:," and "BCC:." This pane 306 shows the current participants in the email conversation, including any changes that have been made to the recipient list. In one embodiment, only the most current recipient list is shown in a composite email.

The example text message pane 308 illustrated in FIG. 3 comprises numerous text portions showing text extracted from various text emails in the email conversation. In the text message pane 308, the text emails are displayed one after the other. This makes it quite easy for a participant to see what has transpired thus far in the email conversation.

Finally, the example attachments pane 310 shows the attachments that have been attached to the email conversation. The attachments include all of the attachments that have been attached to the email conversation up until this point. In this example, there are three attachments, each sent at a different time. Thus, it appears that three attachment emails have been sent thus far in this email conversation. In one embodiment, an attachment may not be overwritten by a subsequent attachment. One approach to facilitating this is to require that all attachments have different filenames. These filenames may be displayed or hidden. In the case of hiding the attachment names, a description may be provided by the participant that originally attaches the file. In the example illustrated in FIG. 3, the first and second attachments are different versions of the same file. This is demonstrated by the descriptive text accompanying the attachment. There are two "File 1: Location Info" attachments, but the first designates it as "Prepared 11/15" while the second designates it as "Revised 11/16."

When a participant is viewing a composite email, the participant can (if given the proper authorities) perform a number of operations to further the email conversation. For example, the text message pane 306 has a user entry section that allows the participant to type in the text of a new text email. The participant can use this section to add new text to respond to a previous text email, or to add new content to the email conversation. Similarly, the subheading pane 304 has a user entry section that allows a new subheading to be entered. Using this section, a participant can add a new sub topic for discussion within the context of the overall subject of the email conversation. Also, the recipient list pane 206 has a user entry section under each of the "TO:", "CC:", and "BCC:" lists. The participant can use these sections to add participants to the email conversation. The participant may also remove participants from the email conversation, or change the authorities given to one or more of the participants in the recipient list. Furthermore, the attachments pane 210 provides controls (not shown) for enabling the participant to manage attachments. With these controls, the participant can add one or more attachments to the email conversation.

After the participant performs one or more of the above operations, the participant can invoke the send function of the EEP 104. When the send function is invoked, one or more emails will be sent out to all of the participants of the email conversation (in one embodiment, the default is to send each email to all of the participants in the email conversation; the exception is a side mail, which is sent to only selected participants; side mails will be discussed in a later section). The number of emails that are sent will depend on what was added by the participant. For example, if the participant added a subheading and a set of text, then two emails will be sent. One email (a subheading email) will contain the new subheading, and the other email (a text email) will contain the new text. If, on the other hand, the participant changed the recipient list, added a new subheading, added a new set of text, and added a new attachment, then four emails will be sent out. Each email that is sent will carry the unique identifier of the email conversation. In addition, in one embodiment, each email will also carry a sub-identifier. Specifically, a text email will carry a text sub-identifier, a recipient list email will carry a recipient list sub-identifier, a subheading email will carry a subheading sub-identifier, and an attachment email will carry an attachment sub-identifier. These sub-identifiers may be generated by the EEP 104 in the manner described previously. Each email will also contain some new content. For example, the text email will contain the new text entered by the participant. Likewise, the subheading email will contain the new subheading added by the participant. In one embodiment, the content contained in these emails is non redundant. That is, they contain only the new content added by the participant and do not include content from previous emails.

As noted previously, a participant is allowed to perform certain operations only if that participant has been given the proper authorities. In one embodiment, to determine the authorities that have been given to a particular participant, the EEP 104 accesses the most recent recipient email in the mail conversation, and extracts the authority information therefrom. Depending on the authorities that have been given to a particular participant, the EEP 104 may adjust one or more user interface components when displaying a composite email. For example, suppose that the EEP 104 is displaying a composite email to a particular participant. Suppose further that, after checking the authority information in the most recent recipient list email, the EEP 104 discovers that this participant has authority to send emails and attachments, but does not have authority to add subheadings or to change the recipient list. In response to this finding, the EEP may gray out the user entry sections of the subheading pane 304 and the recipient list pane 306 (to indicate that these sections cannot be used). The EEP 104 may also disable some controls to not allow the participant to perform operations for which the participant does not have authority. In this and other ways, the EEP 104 is able to enforce the authority restrictions imposed by the administrator (and perhaps, co-administrator(s)) of an email conversation.

Email Conversation Data Structure

In one embodiment, an EEP 104 maintains an email conversation data structure for each email conversation. This data structure enables the individual emails in an email conversation to be easily identified, and enables a composite email for the email conversation to be easily and efficiently generated. In one embodiment, a separate email conversation data structure is maintained for each participant in an email conversation. For example, suppose that a first participant is using client computer 102(1) (FIG. 1A) to participate in an email conversation (put another way, the first participant has an email account that is managed using the EEP 104 on client computer 102(1)). Suppose further that a second participant is using client computer 102(n) to participate in the same email conversation (i.e. the second participant has an email account that is managed using the EEP 104 on client computer 102(n)). In such a case, the EEP 104 on client computer 102(1) maintains an email conversation data structure for the email conversation for the first participant, while the EEP 104 on client computer 102(n) maintains a separate email conversation data structure for the same email conversation for the second participant. In large part, the two email conversation data structures will contain the same data since they pertain to the same email conversation. However, each data structure can contain a significant amount of information that is specific to the participant for which that data structure is maintained.

Figure 4:
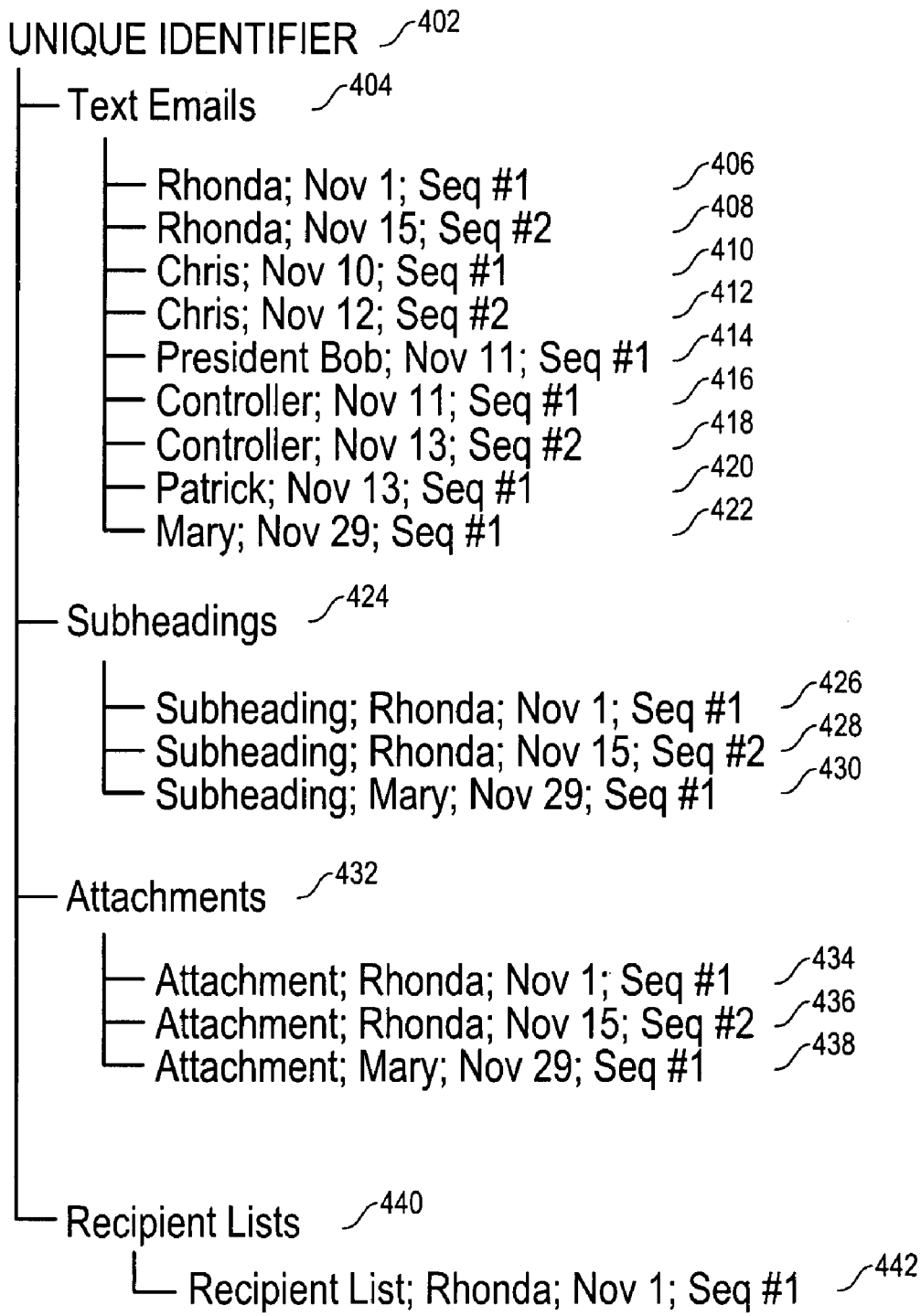
FIG. 4 shows a sample email conversation data structure that is used, in accordance with one embodiment of the present invention, to maintain information indicating which emails are part of an email conversation.

FIG. 4 shows a sample email conversation data structure in accordance with one embodiment of the present invention. The data structure of FIG. 4 corresponds to the email conversation for which a composite email is shown in FIG. 3. It will be assumed for the sake of example that this email conversation data structure is maintained by an EEP 104 for the participant named Mary. In the following discussion, a hierarchical data structure will be described. However, it should be noted that this is done for illustrative purposes only. The email conversation data structure need not be hierarchical in structure. Rather, it may be a flat file, a table, a spreadsheet, a relational database, or any other type of data structure. Further, the data structure may be a single data structure or it may be multiple data structures. All possible implementations are within the scope of the present invention. So long as a data structure can be used to store the information needed to manage the individual emails in an email conversation, it can be used as the email conversation data structure.

As shown in FIG. 4, the email conversation data structure comprises or is associated with a unique identifier 402. This is the unique identifier that is associated with the overall email conversation. All of the individual emails in the email conversation carry this unique identifier. In one embodiment, the header information for the email conversation is stored in entry 402 in association with the unique identifier. This header information may include the information shown in pane 302 of the composite email of FIG. 3, such as the email conversation's administrator's ID information (e.g. email address, user ID, etc.), the date and time the email conversation was started, and the main subject for discussion in the email conversation.

Under the unique identifier are four categories: text emails 402, subheadings 424, attachments 432, and recipient lists 440. These categories correspond to the four panes 308, 304, 310, and 306 of the composite email of FIG. 3, respectively.

Under each category is stored information pertaining to the emails that relate to that category. For example, under the text emails category 404, there is stored information pertaining to the text emails that have been received for this email conversation. In pane 308 of FIG. 3, nine text emails are shown. Information pertaining to each of these nine text emails is stored under the text emails category 404 of the data structure. As shown in FIG. 4, the text sub-identifier for each text email is stored. Specifically, according to the information in the text email pane 308, Rhonda has sent two text emails, one on November 1 and another on November 15. The text sub-identifiers for these two text emails are stored in entries 406 and 408 of FIG. 4, respectively, (recall from previous discussion that each text email in an email conversation carries a text-sub-identifier as well as the unique identifier; for the sake of simplicity, only the dates, and not the dates and times, are shown in these sub-identifiers). Similarly, as shown in pane 308 of the composite email, Chris has sent two text emails, one on November 10 and another on November 12. The text sub-identifiers for these two text emails are stored in entries 410 and 412 of the email conversation data structure. Further examination of pane 308 and the email conversation data structure will reveal that, under the text emails category 404, the email conversation data structure contains the text sub-identifiers for all of the text emails shown in pane 308 (note: for the sake of brevity, pane 308 does not show text emails sent between November 1 and November 10, and between November 16 and November 29; information pertaining to these text emails is not shown in the email conversation data structure; for the sake of example, it will be assumed that none of the missing text emails were sent by Rhonda, Chris, President Bob, Controller, Patrick, or Mary; thus, the sequence numbers shown for these participants in the text sub-identifiers in FIG. 4 are correct).

Under the subheadings category 424, there is stored the subheading sub-identifiers for all of the subheading emails that have been sent thus far in the email conversation. From the subheading pane 304 of FIG. 3, it can be seen that three subheadings (and hence, three subheading emails) have been sent thus far. Rhonda sent one on November 1, Rhonda sent another on November 15, and Mary sent one on November 29. The subheading sub-identifiers for these subheading emails are stored in entries 426, 428, and 430, respectively, of the email conversation data structure under the subheadings category 424.

Under the attachments category 432, there is stored the attachment sub-identifiers for all of the attachment emails that have been sent thus far in the email conversation. From the attachments pane 310 of FIG. 3, it can be seen that three attachments (and hence, three attachment emails) have been sent thus far. One was sent by Rhonda on November 15, another one was sent by Rhonda on November 16, and another one was sent by Mary on November 29. The attachment sub-identifiers for these attachment emails are stored in entries 434, 436, and 438, respectively, of the email conversation data structure under the attachments category 424.

Finally, under the recipient lists category 440, there is stored the recipient list sub-identifiers for all of the recipient list emails that have been sent thus far in the email conversation. In the current example, only one recipient list email has been sent (by Rhonda, the administrator, on November 1). Thus, only one recipient list sub-identifier is stored under the recipient lists category 440.

In addition to storing the sub-identifiers for the various emails, the email conversation data structure may also store other sets of information. For example, the date and time at which each email was opened by the participant (Mary, in the current example) may be stored. In addition, other types of information, which may be used, for example, to control the display of the emails, to manage the sending and receiving of side mails, etc., may also be stored in the email conversation data structure. Some examples of these other types of information will be described in later sections. Overall, the email conversation data structure may be used to store any information that may be useful for managing an email conversation.

Sample Use of Email Conversation Data Structure

To illustrate how an email conversation data structure may be maintained and used by an EEP 104 to generate a composite email, reference will now be made to an example, which is a continuation of the above example. Suppose that Mary uses an EEP 104 to log in to her email account. Suppose further that since the last time Mary opened an email in the email conversation shown in FIGS. 3 and 4, two more emails relating to the email conversation have arrived. One of the new emails is a subheading email that was sent by Rhonda (the subheading sub-identifier for this subheading email would be: Subheading; Rhonda; dts (where dts stands for data/time sent); seq #3)), and the other new email is a text email that was sent by Patrick (the text sub-identifier for this text email would be: Patrick; dts; seq #2). It will be assumed that neither of these new emails has been opened yet by Mary (put another way, neither of these new emails have been previously accessed by Mary).

Suppose now that Mary invokes the EEP 104 to open/access the new text email from Patrick. When the EEP 104 opens this email, it checks to see if the email has a unique identifier associated therewith. If not, then the email is just a regular email and there is no need to generate a composite email. If, however, the text email does have a unique identifier associate therewith, thereby indicating that it is part of an email conversation, then the EEP 104 will proceed to generate a composite email. In the current example, the email does have a unique identifier associated therewith; thus, the EEP 104 will proceed to generate a composite email.

In one embodiment, the EEP 104 does so by initially extracting the unique identifier from the email. The EEP 104 also extracts from the email any sub-identifiers that are included therein. In the current example, the email is a text email, which carries a text sub-identifier. Thus, the EEP 104 will extract both the unique identifier and the text sub-identifier from the text email. Using the unique identifier, the EEP 104 accesses the email conversation data structure shown in FIG. 4. Thereafter, the EEP 104 updates the data structure by storing the text sub-identifier for the new text email into the data structure under the text emails category 404 (this new text sub-identifier is not shown in FIG. 4). The date and time at which the text email was opened may also be stored. The email conversation data structure is thus updated with information pertaining to Patrick's new text email.

In one embodiment, the EEP 104 thereafter determines whether there are other unopened emails in Mary's email account that are part of the same email conversation. If so, then the EEP 104 will open those emails and extract information from them as well. To do so, the EEP 104, in one embodiment, inspects each currently unopened email (for example, in an Inbox folder), and checks to see if that email carries the unique identifier. In the current example, there is one more unopened email (the one from Rhonda) that carries the unique identifier. Thus, in the current example, the EEP 104 opens/accesses that email, and extracts the unique identifier therefrom. The EEP 104 also extracts from the email any sub-identifiers that are included therein. In the current example, the email is a subheading email, which carries a subheading sub-identifier. Thus, the EEP 104 will extract both the unique identifier and the subheading sub-identifier from the subheading email. Using the unique identifier, the EEP 104 again accesses the email conversation data structure shown in FIG. 4. Thereafter, the EEP 104 updates the data structure by storing the subheading sub-identifier for the new subheading email into the data structure under the subheadings category 404 (this new subheading sub-identifier is not shown in FIG. 4). The date and time at which the subheading email was opened may also be stored. The email conversation data structure is thus updated with information pertaining to Rhonda's new subheading email. Assuming that there are no more unopened emails relating to this email conversation, the EEP 104 is done with updating the email conversation data structure. In one embodiment, the email conversation data structure is accessed and updated (if necessary) in the manner described above whenever any email in the email conversation is opened. This is true regardless of whether the email being opened is an email that has not yet been opened or is an email that had previously been opened.

After the email conversation data structure is accessed and updated (if necessary), it is used by the EEP 104 to generate a composite email for the email conversation. In one embodiment, the EEP 104 generates a composite email by accessing the header information stored in the unique identifier entry 402 of the email conversation data structure. Using this header information, the EEP 104 populates the header pane 302 of FIG. 3.

The EEP 104 further proceeds to access each of the text emails referenced by the text sub-identifiers stored under the text emails category 404. From each text email, the EEP 104 extracts the text therefrom. Then, the EEP 104 uses the extracted text from each of the text emails to populate the text pane 308 of FIG. 3 (in the current example, the text pane 308 would further include text from the new text email sent by Patrick). In one embodiment, the text from the new text email may be shown in a different manner (e.g. highlighted, different color, different font, etc.) than the text for the previously opened emails. That way, the participant can easily see which text email is new. In the example shown in FIG. 3, the text emails are arranged chronologically in ascending order. If so desired, the text emails may be arranged according to some other order (e.g. descending order) or sorted by some other criteria (e.g. by sender, etc.).

The EEP 104 implements a similar procedure for subheadings and attachments. Specifically, in one embodiment, the EEP 104 accesses each of the subheading emails referenced by the subheading sub-identifiers stored under the subheadings category 424. From each subheading email, the EEP 104 extracts the subheading therefrom. Then, the EEP 104 uses the extracted subheadings to populate the subheading pane 304 of FIG. 3 (in the current example, the subheading pane 304 would further include the subheading from the new subheading email sent by Rhonda). In one embodiment, the text from the new subheading email may be shown in a different manner (e.g. highlighted, different color, different font, etc.) than the text for the previously opened subheading emails. That way, the participant can easily see which subheading is new.

Similarly, the EEP 104 accesses each of the attachment emails referenced by the attachment sub-identifiers stored under the attachments category 432. From each attachment email, the EEP 104 extracts the attachment (or a set of information describing the attachment and its location) therefrom.

Then, the EEP 104 uses the extracted information to populate the attachment pane 310 of FIG. 3.

In one embodiment, the recipient list emails are processed slightly differently. Rather than accessing all of the recipient list emails referenced by the recipient list sub-identifiers stored under the recipient list category 440, the EEP 104, in one embodiment, accesses only the recipient list email with the latest sent date. It is assumed that this email overrides all previous recipient list emails. After the most recently sent recipient list email is accessed, the EEP 104 extracts the recipient list and authority information therefrom, and uses all or some of that information to populate the recipient list pane 306 of FIG. 3. In the manner described, the EEP 104 is able to generate the composite email using the email conversation data structure. After the composite email is generated, it may be displayed to a participant via a composite email user interface, such as that shown in FIG. 3. In the current example, the composite email is displayed to the participant named Mary.

In one embodiment, as part of the process of generating the composite email user interface, the EEP 104 determines the authorities that have been given to the participant for which the user interface is being generated. The EEP 104 may make this determination by accessing the most recently sent recipient list email, and extracting the authority information therefrom for the participant. Based upon these authorities, the EEP 104 may adjust the user interface accordingly. For example, if the participant does not have authority to add subheadings, then the user interface may be generated such that the user entry portion of the subheading pane 304 is grayed out, thereby indicating that that field cannot be used. Similarly, if the participant does not have authority to perform certain operations, then certain controls of the user interface may be deactivated to prevent the participant from performing those operations. Furthermore, if a participant has authority to perform an operation, then when the participant places the mouse pointer over a certain area of the display, a certain user interface component (e.g. a bubble or a + sign) may appear, whereas if the participant did not have authority to perform the operation, the user interface component would not appear. By adjusting the user interface in this and other ways, the EEP 104 can enforce the authorities/restrictions imposed by the administrator (or perhaps co-administrator(s)) of the email conversation to ensure that the participant is not allowed to perform any operation for which the participant has not be granted authority.

Adjusting the user interface is just one of the possible ways of enforcing the authorities/restrictions imposed by the administrator (or perhaps co-administrator(s)) of the email conversation. As an alternative, the user interface may be left the same for all participants. However, at the time the participant attempts to perform an operation, the EEP 104 may check (e.g. by accessing the most recent recipient list email in the email conversation) to see if the participant has been granted authority to perform that operation. If not, then the EEP 104 may disallow that operation. For purposes of the present invention, these and other methodologies may be used to enforce the authorities/restrictions imposed by the administrator (or perhaps co-administrator(s)) of the email conversation.

In the above example, the email conversation data structure is updated at the time a previously unaccessed email in the email conversation is first accessed. In one embodiment, the email conversation data structure may also be updated at other times. For example, when a participant sends out an email in the email conversation, the email conversation data structure for that participant may be updated to include information pertaining to that email that was just sent. Also, whenever a participant makes any changes to any of the attributes (display settings, markups, etc described in later sections) of a composite email, the email conversation data structure for that participant may be updated to indicate the changes. Thus, the email conversation data structure may be updated at various times to keep its contents current.

Manipulating a Composite Email Display

When a participant is viewing a composite email display, the participant may customize/manipulate the display in many different ways. The following discussion sets forth some (but not all) examples of how the display may be customized/manipulated. For example, the participant may specify that all text in the display should be in a certain font of a certain size. The participant may also specify that certain display elements should be shown in certain colors. These and other display preferences may be specified. These preferences may be saved so that they are applied every time the composite email is generated. Such global preferences may be saved in the email conversation data structure (FIG. 4) at, for example, the unique identifier level 402. That way, the next time the EEP 104 uses the email conversation data structure to generate the composite email, it will see the display preferences, and know that they should be applied generally to the entire display.

The display preferences may also be specified at more granular levels. For example, the participant may specify that only recently sent text emails, such as those sent within the last thirty days, should be displayed in the text emails pane 308. This preference may be saved in the email conversation data structure, for example, in association with the text emails category 404. That way, the next time the EEP 104 uses the email conversation data structure to generate the composite email, it will know to apply the date filter to all of the text emails under the text emails category 404 to cause the text emails pane 308 to show only recently sent text emails.

The participant may also specify that only text emails pertaining to a certain subheading should be displayed in the text emails pane 308. For example, the participant may select the November 1 subheading to cause only those text emails sent between November 1, the date the subheading was created, and November 15, the date the next subheading was created, to be displayed. This preference, which may take the form of a date range (e.g. November 1 to November 15) may be saved in the email conversation data structure, for example, in association with the text emails category 404. That way, the next time the EEP 104 uses the email conversation data structure to generate the composite email, it will know to include only those text emails that were sent within the specified date range in the text emails pane 308.

The participant may further specify at an even lower granularity level that text emails sent by certain participants, and even specific text emails, should not be displayed within the text emails pane 308. This preference may be saved in the email conversation data structure, for example, in association with each of the entries corresponding to the text emails that are to not be displayed. For example, if the participant specifies that all text emails sent by Controller should not be displayed, then additional information may be stored in entries 416 and 418 of the email conversation data structure to indicate that those text emails should not be displayed. If the participant specifies that only the text email associated with entry 418 should not be displayed, then additional information may be stored in just entry 418 to indicate that that particular text email should not be displayed. That way, the next time the EEP 104 uses the email conversation data structure to generate the composite email, it will know to exclude specific text emails from the text emails pane 308 (in place of the text emails, the EEP 104 may display the text "{Email Not Shown}").

A participant may also "mark" certain portions of one or more individual emails. For example, the text in a subheading (for example, the subheading sent by Rhonda on Nov. 15) may be marked. Similarly, the text in a text email (for example, the text email sent by Patrick on November 13) may be marked. A participant may select words, phrases and/or lines of the individual email that are to be marked. This may be accomplished by selecting the desired portion, for example with a mouse cursor. Once the text and lines of the email are identified, the participant can decide how to operate upon the identified text and lines. GUI elements such as buttons may be displayed at points in the composite email display, such as the top and bottom of the composite email display, and also above and below each individual email in the composite email display, that when selected cause an operation to be performed on marked portions of the email.

One operation that may be applied to a marked portion of an email is that a participant can print the marked portion. Another operation that may be applied to a marked portion of an email is to remove the marked portion from display. A portion of an email in the composite email display may be marked and removed from display in response to a participant command. Once removed from display, the text is replaced by phrases such as {words removed} or {lines removed}. The text removal may be undone. For example, the participant can move the mouse over to the words shown in place of the removed text, and undo the removal by issuing an appropriate command. This process brings back into display the previously removed text.

Another operation that may be performed on a marked portion of an email is to remove from display everything else in that email except for the marked portion. For example, the participant may desire to remove a large amount of lines and text from display, and identifying them may be a more time consuming task than the opposite of identifying what the participant wants to retain in the display. In response to this operation, the text and lines identified are retained, and everything else in the email is removed from display. The text or lines thus removed from display are replaced by phrases such as {words removed} or {lines removed}. The text removal may be undone. For example, the participant can move the mouse over to the words shown in place of the removed text, and undo the removal by issuing an appropriate command. This process brings back into display the previously removed text. In one embodiment, the participant can, by moving the mouse to any word within the parentheses { }, see the words or lines removed from display. The "remove all else from display" command may operate to apply the command to one individual email, or to several individual emails in the composite email display. As mentioned above, only the individual emails which have text or lines identified (in the reverse manner as described) are affected by this command, other individual emails that are part of the composite email display are not affected.

Another operation that may be performed on a marked portion of an email is to highlight the marked portion; for example, in color. The participant may choose different highlighted colors for different purposes. In one example of choosing colors, a participant may highlight in yellow to identify notable text, in pink for text he mildly disagrees with, in red for text he strongly disagrees with, in green for text he is in agreement with, and finally in blue for irrelevant text. The participant may then choose to display, print, or extract only one or more of the highlighted color in the display. The participant may change the color of the highlighted text, or undo a part or all of any highlighted text. In one embodiment, the participant specifies a color for highlighting new, unread emails upon opening an email conversation in which the new, unread emails are displayed. That color is one that would be reserved for highlighting the new, unread emails, and therefore would be unavailable for other highlighting.

Another operation that may be performed on a marked portion of an email is to underline the marked text, similar to the color highlighting options described above. The participant may choose to underline text and has the option of selecting the color for underlining. In one embodiment, the only color not available to the participant is the color of the individual email text (usually black), to differentiate the individual email author's underlining (same color as his text, usually black) from the participant's selective color underlining. In every other way, color underlining works just as color highlighting does, as described above.

Another operation that may be performed on a marked portion of a composite email display is to strike out the selected text. In the "remove from display" option described above, the participant cannot see the text unless the command is temporarily or permanently undone. In using the option to strikeout, a line is drawn across the middle of the text, but the text is displayed so the participant is aware of the text that is marked by the strikeout. The participant can choose to display, print or extract this text with the strikeout line across the text or not.

Another operation that may be performed on a marked portion of a composite email display is to insert one or more reminders that are linked to the marked text. As will be described in a later section, these reminders may be gathered and displayed to a participant to remind the participant to perform one or more tasks or to follow up on one or more emails. In one embodiment, to link a reminder to a set of marked text, the participant invokes a user interface component (e.g. a button) to instruct the EEP 104 to add a reminder to the marked text. In response to the invocation of this component, the EEP 104, in one embodiment, provides several user interface components. One interface component may be a drop down menu of options that were previously created by the participant. For example, an active board member may have regular meetings that he attends or regular tasks that he performs (e.g. meet with chairman, meet with president, review sales report, etc.). Rather than hand-enter these items every time, the participant may put these items into the drop down menu. That way, the participant can simply select the desired meeting or task from the drop down menu the next time he/she wants to add a reminder. Another interface component that the EEP 104 may provide is a free format text field. This field allows the participant to enter custom text for the reminder. In addition, the EEP 104 provides a field for entering a date and/or time to be associated with the reminder. The information in this field allows the EEP 104 to know when the reminder should be shown to the participant. In the above discussion, the reminder is linked to the marked text of an email. As an alternative, the reminder may simply be linked to an email itself and not to any particular marked portion of the email. The processing of reminders will be elaborated upon in a later section.

Another operation that may be performed on a marked portion of a composite email display is to insert a comment that is then associated with the marked portion. In response to inserting a comment, the selected text display automatically adjusts to make space between lines of selected text so that this space can accommodate the participant's comments. For example, the participant may have selected lines 4 and 5 of an individual email, and then chosen to insert a comment for the marked portion. The display provides for a line of text to be entered by the participant between lines 3 and 4 and another one between lines 4 and 5. In one embodiment, the result would be a line of participant's comments above line 4, followed by original email text on line 4, followed by a line of participant comments above line 5, followed by original line 5. Thus, if the participant selects text from only one line, the display adjusts to provide for comments in a line above; and similarly, if the participant has selected several lines of text, the space is created above each line of selected text.

The participant may choose specific colors for his comments, and may choose a specific font for his comments from a predetermined selection of fonts. The selection may be such that the font is distinctive, such as a handwriting or bold type of font, so that the participant's comments when displayed, printed or emailed are clearly distinguishable. The participant is provided options to add another line or lines of participant comments wherever needed. The participant can choose to remove the comments from display whenever the participant wishes to not see them, and choose to export, print or make extracts of comments in reports.

While one embodiment makes space between lines for the participant to enter comments, another option makes space in the margin (left, or right, or both, specified by the participant) by realigning the left and right margins of the text. The comments are displayed whenever the participant accesses the email, and these comments are once again available for the participant to select and print, export, display or not display, or include in extracts. The participant has an additional option to set the size of the margin by increasing or decreasing the indent on the text.

Another operation that may be performed on a marked portion of a composite email display is to provide editorial comments and notations. According to an embodiment, in response to selecting this operation, several steps are initiated simultaneously. First, the participant is prompted to highlight or underscore the selection, as described above. Next, the operations described above which insert comments and margin commands are executed, resulting in the display adjusting for space between the selected text lines for the participant to enter comments, and adjusting for space in both margins for the participant to enter margin comments. Next, a GUI element, for example consisting of a menu of standard editorial notations, is displayed to the participant so the participant can point and select, and then drag and drop these notations between lines, in the margins, and/or above or below the identified email text. Some notations may be inserted between words of the email content or between characters within a word of the email content. The participant can use multiple markings; for example, the participant can highlight as well as make a margin comment, or underscore as well as insert comments between lines, or strikeout as well as make margin comments.

The participant can make the markings discussed above temporary (i.e. valid for only this viewing of the composite email; the next time the composite email is generated, the markings will not appear) or the participant can make them permanent (i.e. they will appear in all future generations of the composite email until changed). In one embodiment, to make the markings permanent, the EEP 104 stores the markings in the email conversation data structure. For example, suppose that the participant has made some markings to the text email sent by Patrick on November 13 (pane 308 of FIG. 3). To make these markings permanent, the EEP 104 may save the markings in the email conversation data structure (FIG. 4) in entry 420 so that they are associated with the text sub-identifier for Patrick's email. In one embodiment, markings are saved as one or more sets of commands and/or data. Whatever form it takes, the information that is stored in entry 420 contains sufficient information that the EEP 102 can reproduce the markings at a later time when the composite email is once again generated and the email from Patrick is once again displayed in the composite email. The same may be done for reminders. Thus, if the participant also linked a reminder to all or a portion of the text email sent by Patrick on November 13, then information pertaining to the reminder may also be stored in the email conversation data structure (FIG. 4) in entry 420. This enables the reminder to be associated with the text sub-identifier for Patrick's email, which in turn enables the reminder to be linked to Patrick's email.

In one embodiment, any characteristic of an email that is part of the composite email display may be identified and the display modified based on those characteristics. For example, a sender could be a characteristic, as could a date and/or time an email was sent or received. Once the particular characteristic(s) desired to be displayed are chosen, for example by an interface element, then the individual messages meeting or otherwise conforming to the chosen criteria may be selectively displayed. This display may be customized by a participant; for example, individual emails in a composite email display that were sent by a chosen recipient on a chosen day may be displayed alone, or may be highlighted or in a different color, or according to any number of visual approaches.

Side Mails

In one embodiment, every email (e.g. header email, text email, recipient list email, subheading email, attachment email) that is sent as part of an email conversation is, by default, sent to all of the participants in the email conversation. That way, everyone in an email conversation is generally able to "hear" everything that everyone else is "saying". An exception to this default is a side mail. A side mail is an email that is sent to only a subset of the participants of the email conversation, and only those participants will be able to view it. A side mail may be analogized to several participants whispering during a meeting. Although their side conversation is still a part of the overall conversation, they are the only ones privy to it. In one embodiment, there are three types of side mails: text side mail, markup side mail, and automated side mail. Each type will be described below.

Text Side Mail

In one embodiment, a text side mail is used to comment on or to further discuss a particular text email with just a subset of the participants of an email conversation. Because a text side mail discusses a particular text email, it is associated with that text email. For example, suppose that Mary wishes to further discuss with Rhonda and Controller the text email sent by Rhonda on November 15 (see pane 308 of FIG. 3). To do so, Mary may send a text side mail to just Rhonda and Controller. This text side mail will be associated with Rhonda's text email sent on November 15.

In one embodiment, to prepare a text side mail, a participant selects the text email that the participant wishes to discuss. In the above example, Mary would select the text email sent by Rhonda on November 15. Mary would then activate a control to prepare a text side mail for this text email. In one embodiment, this causes some user interface component (e.g. a text entry box) to appear, which would enable Mary to enter the text of the text side mail. As part of the text side mail preparation process, Mary has to specify the participants that will be participating in the side conversation that will be conducted using the text side mail. In the current example, the participants are Mary, Rhonda, and Controller.

When Mary instructs the EEP 104 to send the text side mail, the EEP 104 composes the text side mail, and sends it to the proper recipients. In one embodiment, in composing the text side mail, the EEP 104 includes the following information in the text side mail: (1) the unique identifier for the email conversation (even though the text side mail is part of a side conversation, it is still part of the overall email conversation); (2) the text sub-identifier for the text email with which the text side mail is associated (in the current example, this would be the text sub-identifier associated with the email sent by Rhonda on November 15, which would be: Rhonda; November 15; seq #2); (3) the text of the text side mail; (4) the list of participants for the text side mail (Mary, Rhonda, and Controller in the current example); and (5) a side mail sub-identifier for the text side mail. In one embodiment, the side mail sub-identifier is generated by the EEP 104, and comprises some text (e.g. "sidemail") indicating that the email is a text side mail, an email identifier (e.g. an email address or user ID) for the participant who created and sent the text side email (Mary in the current example), a date and time code, and a sequential counter. In the context of this sub-identifier, the sequential counter indicates how many text side mails have been sent by this participant in this email conversation with regard to this particular text email. This is just one possible method for generating a side mail sub-identifier. Other methods may be used if so desired. All such methods are within the scope of the present invention. After the text side mail is composed, it is sent by the EEP 104 to the proper recipients (Rhonda and Controller in the current example).

In one embodiment, after the text side mail is sent, the EEP 104 updates the email conversation data structure maintained for Mary to include information pertaining to the text side mail. This may be done, for example, by storing a sub entry under entry 408 (FIG. 4). This sub entry would contain the side mail sub-identifier associated with the text side mail. In the current example, the sub-identifier would be: sidemail, Mary, dts; seq #1 (this is not shown in FIG. 4). By storing the information pertaining to the text side mail in this manner, it is clear that the text side mail is associated with the text email sent by Rhonda on November 15.

When one of the recipients of the text side mail (e.g. Controller) opens the text side mail, the EEP 104 used by that recipient will update the email conversation data structure maintained for that recipient, and generate a composite email for the email conversation. Specifically, in one embodiment, the EEP 104 extracts the unique identifier, the text sub-identifier, and the side mail sub-identifier from the text side mail. Using the unique identifier, the EEP 104 accesses the email conversation data structure of FIG. 4. Based on the side mail sub-identifier, the EEP 104 determines that this is a text side mail. From the text sub-identifier, the EEP 104 ascertains that this side mail is associated with the text email sent by Rhonda on November 15. Given all of this information, the EEP 104 knows how to update the email conversation data structure for that recipient. This updating may be done in a manner similar to that described above in connection with Mary. For example, the EEP 104 may store a sub entry under the entry in the email conversation data structure that corresponds to the text email sent by Rhonda on November 15. This sub entry would contain the side mail sub-identifier: sidemail; Mary; dts; seq #1. This information will indicate that there is a side mail associated with the text email sent by Rhonda on November 15.

After the email conversation data structure of the recipient is updated, the EEP 104 used by the recipient proceeds to use the data structure to generate the composite email for the email conversation. The composite email may be generated in the manner previously described. When the EEP 104 arrives at the newly created sub entry in the email conversation data structure for the text side mail, it knows from the side mail sub-identifier that the email is a text side mail. The EEP 104 also knows that the side mail is associated with the text email sent on November 15 by Rhonda. Thus, the EEP 104 will extract the text from the text side mail, and place that text in pane 308 (FIG. 3) underneath the text for the text email sent by Rhonda on November 15. The text for the side mail may be displayed in a different fashion (e.g. indented, in a different font, in a different color, etc.) to indicate that it is a side mail. In this manner, the EEP 104 is able to recognize the email as a side mail, and is able to put it in the correct location in the composite email display.

One or more replies may be sent in response to a text side mail. In one embodiment, each reply will be sent to only the participants of the side mail, and each reply will carry the unique identifier, the text sub-identifier, and the side mail sub-identifier discussed above. These identifiers will allow the EEP 104 opening the replies to associate the replies with the proper side mail, the proper text email, and the proper email conversation. When a reply to a side mail is opened, the EEP 104 will process it in the same manner as that described above. In one embodiment, a text side mail and all of its replies will be displayed underneath the text of the text email with which the text side mail is associated. This is so regardless of when the side mail and replies were sent relative to other text emails. For example, even if a reply to the above side mail were sent on December 1, it would still be displayed underneath the text for the text email sent by Rhonda on November 15 (see FIG. 3) but above the text for the text email sent by Mary on November 29. This is so despite the fact that the reply was sent on December 1, which is after November 29, the date on which the text email by Mary was sent. Displaying the side mails in this way enables all of the side mails pertaining to a particular text email to be shown together. This allows the side mails to be presented in a more intuitive fashion. In the manner described, participants can use text side mails to carry on a private conversation within the context of an overall email conversation.

Markup Side Mail

As discussed previously, when a participant is viewing a composite email display, the participant may mark one or more portions of one or more of the emails (e.g. text email, subheading email, etc.) shown in the composite email display. Various operations may be performed on the marked portions. As discussed above, these operations may include highlighting, underlining, adding comments, adding reminders, etc. In one embodiment, the participant is allowed to share these markings with one or more other participants by sending a markup side mail. The markup side mail will include sufficient information pertaining to the markings that the EEP 104 on the recipient's end will be able to reproduce the markings so that the markings are shown in the recipient's composite email display for the affected email.

In one embodiment, to prepare a markup side mail, a participant selects an email that has been marked up (this email will be referred to as the marked up email). The participant then activates a user interface control to indicate to the EEP 104 that the participant wishes to send a markup side mail for this marked up email. The activation of the control may cause a user interface component (e.g. a drop down list) to appear, which would allow the participant to specify the recipient(s)

of the markup side mail. After the recipient(s) are specified, the participant instructs the EEP 104 to send the markup side mail.

In response to the send command, the EEP 104 composes the markup side mail. In one embodiment, the EEP 104 does so by collecting markup information for the marked up email. In one embodiment, this markup information specifies all of the markings that have been made to the marked up email, and may take the form of various commands and/or data. The markup information may have already been stored in the email conversation data structure (as described above). After the markup information is collected, the EEP 104 proceeds to compose the markup side mail. In one embodiment, the EEP 104 includes the following information in the markup side mail: (1) the unique identifier for the email conversation; (2) the sub-identifier for the marked up email (this identifies the email to which the markings are to be applied); (3) the collected markup information; (4) the list of recipients for the markup side mail; and (5) a markup side mail sub-identifier for the markup side mail. In one embodiment, the markup side mail sub-identifier is generated by the EEP 104, and comprises some text (e.g. "markup") indicating that the email is a markup side mail, an email identifier (e.g. an email address or user ID) for the participant who created and sent the markup side email, a date and time code, and a sequential counter. In the context of this sub-identifier, the sequential counter indicates how many markup side mails have been sent by this participant in this email conversation with regard to this particular marked up email. This is just one possible method for generating a markup side mail sub-identifier. Other methods may be used if so desired. All such methods are within the scope of the present invention. After the markup side mail is composed, it is sent to the specified participants. Once the markup side mail is sent, the EEP 104 may record in the sending participant's email conversation data structure that a markup side mail associated with the marked up email was sent, and the EEP 104 may display a user interface component next to the marked up email in the composite email display to show that a markup side mail was sent for that email.

When one of the recipients opens the markup side mail, the EEP 104 used by that recipient will update the email conversation data structure for that recipient, and generate a composite email for the email conversation. Specifically, in one embodiment, the EEP 104 extracts the unique identifier, the sub-identifier for the marked up email, and the markup side mail sub-identifier from the markup side mail. Using the unique identifier, the EEP 104 accesses the email conversation data structure. Based on the markup side mail sub-identifier, the EEP 104 determines that this is a markup side mail. From the sub-identifier of the marked up email, the EEP 104 determines which specific email is affected by the markings. Given all of this information, the EEP 104 knows how to update the email conversation data structure. For example, the EEP 104 may store a sub entry under the entry containing the sub-identifier for the marked up email. This sub entry would contain the markup side mail sub-identifier, and may further contain the markup information. The sub entry indicates that there is a markup side mail associated with the marked up email, and the markup information specifies what markings have been made to the marked up email.

After the email conversation data structure is updated, the EEP 104 proceeds to use the data structure to generate the composite email for the email conversation. The composite email may be generated in the manner previously described. When the EEP 104 arrives at the newly created sub entry in the email conversation data structure for the markup side mail, it knows from the markup side mail sub-identifier that the email is a markup side mail. The EEP 104 also knows that the markup side mail is associated with the marked up email. In one embodiment, the EEP 104 does not automatically apply the markings in the markup side mail to the marked up email in the composite email display. Rather, a notation is shown next to the marked up email to indicate that a markup side mail has been received. If the recipient activates a user interface control to instruct the EEP 104 to apply the markings from the markup side mail, then the EEP 104 will apply the markings to the marked up email. Once that is done, the recipient will see the markings that were made by the sender of the markup side email. In one embodiment, a markup side mail cannot be replied to, but a recipient can forward it to one or more other participants.

Automated Side Mail

During the course of an email conversation, one or more emails may be lost (e.g. due to network issues, server issues, program malfunctions, etc.). This may cause one or more participants to miss out on potentially important information. To prevent this from happening, one embodiment of the present invention checks for missing emails in the email conversation. If any emails (header, text, recipient list, sub-heading, or attachment) in the email conversation are discovered to be missing, then a recovery process is implemented to recover the lost emails. In one embodiment, the recovery process is implemented using automated side mails. To illustrate how the discovery and recovery process may be carried out in accordance with one embodiment of the present invention, reference will be made to an example, which is a continuation of the example shown in FIGS. 3 and 4.

Suppose that the participant named Mary receives a third text email from the participant named Chris. This text email would carry the unique identifier for the email conversation. It would also carry the text sub-identifier: Chris; dts; seq #3 (the seq #3 indicates that this is the third text email sent by Chris for this email conversation). Suppose now that Mary invokes the EEP 104 to open the new text email from Chris. As described previously, when the EEP 104 opens a new email in the email conversation, it updates the email conversation data structure (FIG. 4). In one embodiment, the EEP 104 does so by initially extracting the unique identifier from the new text email. The EEP 104 also extracts the text sub-identifier from the new text email. Using the unique identifier, the EEP 104 accesses the email conversation data structure. Thereafter, the EEP 104 updates the email conversation data structure by storing the text sub-identifier for the new text email into the data structure under the text emails category 404 (this new text sub-identifier is not shown in FIG. 4). The date and time at which the new text email was opened may also be stored. The email conversation data structure is thus updated with information pertaining to Chris' new text email.

In one embodiment, at the time the EEP 104 updates the email conversation data structure with information pertaining to a new email, it checks to see if the email conversation is missing information pertaining to an immediately preceding email. As used herein, the term "immediately preceding email" refers to an email that is of the same type as the new email, that is sent by the same participant as the new email, and that has a seq # that immediately precedes the seq # of the new email. In the current example, the new email is a text email sent by Chris having a seq #3 in its text sub-identifier; thus, the immediately preceding email is the text email that was previously sent by Chris having the seq #2 in its text sub-identifier. In one embodiment, the EEP 104 checks for a missing immediately preceding email by looking for a sub-identifier in the email conversation data structure that has the proper criteria. In the current example, the EEP 104 would look for a text sub-identifier showing Chris as the sender and having a seq #2. If no such text sub-identifier is found in the email conversation data structure, then it means that Chris' immediately preceding text email was lost.

In one embodiment, the EEP 104 checks only for the immediately preceding email each time the email conversation data structure is updated. It does not look for all missing emails of the same type sent by the same participant. However, it should be noted that, if so desired, the EEP 104 could check for all missing emails of the same type sent by the same participant. In the above example, the EEP 104 could check the email conversation date structure for all previous text emails sent by Chris (these would be Chris's text emails with seq #'s less than three). In fact, the EEP 104 could, if so desired, check for all missing emails of all types sent by all participants each time the email conversation data structure is updated. This may be done using the seq #'s in the sub-identifiers in the manner disclosed above. These and other implementations are within the scope of the present invention.

Suppose now for the sake of example that Mary never received the second text email sent by Chris. Thus, the email conversation data structure maintained for Mary will not contain the text sub-identifier: Chris; November 12; seq #2 (i.e. entry 412 does not exist in Mary's email conversation data structure). When the EEP 104 discovers (in the manner described above) that this text email is missing, it implements an email recovery process. In one embodiment, it does so by preparing and sending an automated side mail (the EEP 104 may prepare the automated side mail without input from Mary, or it may ask Mary whether she wishes to send the automated side mail).

Initially, in preparing the automated side mail, the EEP 104 determines who to send the automated side mail to. In one embodiment, the automated side mail may be sent to the administrator of the email conversation and/or to someone designated by the administrator as being the person to receive automated side mails. The EEP 104 determines the proper recipient for the automated side mail by accessing the most recent recipient list email for the email conversation and extracting the authority information therefrom. For the sake of example, it will be assumed that the automated side mail should be sent to the administrator. In the current example, the administrator is Rhonda; thus, the automated side mail is addressed to Rhonda.

After the proper recipient is determined, the EEP 104 composes the automated side mail. In one embodiment, the EEP 104 includes the following information in the automated side mail: (1) the unique identifier for the email conversation; (2) the recipient list for the automated side mail (Rhonda in the current example); (3) information identifying the email that is missing (in the current example, the EEP 104 would specify that it is missing a text email sent by Chris having a seq #2); and (4) an automated side mail sub-identifier. In one embodiment, the automated side mail sub-identifier is generated by the EEP 104, and comprises some text (e.g. "auto") indicating that the email is an automated side mail, an email identifier (e.g. an email address or user ID) for the participant (Mary in the current example) on whose behalf the automated side mail was created and sent, a date and time code, and a sequential counter. In the context of this sub-identifier, the sequential counter indicates how many automated side mails have been sent on behalf of this participant in this email conversation. This is just one possible method for generating an automated side mail sub-identifier. Other methods may be used if so desired. All such methods are within the scope of the present invention. After the automated side mail is composed, it is sent to the specified participant(s). Once the automated side mail is sent, the EEP 104 may record in the email conversation data structure that an automated side mail was sent requesting the text email sent by Chris having seq #2. The EEP 104 may also display a message to Mary indicating that the automated side mail was sent.

At some point, Rhonda, the administrator of the email conversation, receives the automated side mail. When Rhonda invokes an EEP 104 to open the automated side mail, the EEP 104 processes the automated side mail as follows (as an alternative, the EEP 104 may process the automated side mail without Rhonda even opening the automated side mail). Initially, the EEP 104 extracts from the automated side mail the unique identifier, the automated side mail sub-identifier, and the information identifying the email that is missing. Using the unique identifier, the EEP 104 accesses the email conversation data structure maintained for Rhonda, the administrator. Based on the automated side mail sub-identifier, the EEP 104 determines that this is an automated side mail sent by Mary requesting that a missing email be re-sent. From the information identifying the email that is missing, the EEP 104 ascertains that the email that should be re-sent is the text email sent by Chris having a seq #2. Given all of this information, the EEP 104 knows how to update the email conversation data structure. For example, the EEP 104 may add some information to the entry that contains the text sub-identifier for Chris' second text message. This information may indicate that Mary has requested that this text email be re-sent to her, and may include the automated side mail sub-identifier.

After the EEP 104 updates Rhonda's email conversation data structure, it may prepare a response to the automated side mail (the EEP 104 may automatically prepare this response without input from Rhonda, or it may ask Rhonda whether she wishes to re-send the requested text email). In the response, the EEP 104, in one embodiment, includes: (1) the unique identifier of the email conversation; (2) the automated side mail sub-identifier; (3) a recipient list (Mary in the current example); and (4) the text email requested by the automated side mail (the second text email sent by Chris in the current example). After the response is prepared, it is sent back to the sender of the automated side mail (Mary). The email conversation data structure maintained for Rhonda may then be updated to indicate that a response to the automated side mail was sent.

At some point, Mary receives the response to the automated side mail. When Mary invokes an EEP 104 to open the response, the EEP 104 proceeds to update the email conversation data structure maintained for Mary. In one embodiment, the EEP 104 extracts from the response the unique identifier, the automated side mail sub-identifier, and the second text email sent by Chris. Using the unique identifier, the EEP 104 accesses the email conversation data structure maintained for Mary. Based on the automated side mail sub-identifier, the EEP 104 determines that this is a response to the automated side mail that was sent previously. From the information previously stored in the email conversation data structure for this automated side mail, the EEP 104 determines that the automated side mail requested the second text email from Chris. Thus, the EEP 104 knows that the email extracted from the response is the second text email from Chris. In one embodiment, the extracted email comprises the original text email's text sub-identifier (Chris; November 12; seq #2 in the current example). Using this text sub-identifier, the EEP 104 updates the email conversation data structure. In one embodiment, the EEP 104 further stores information in the email conversation data structure to indicate that a response to the automated side mail has been received and processed. The response is thus fully processed, and the email conversation data structure is updated.

In one embodiment, when the EEP 104 updates the email conversation data structure with the text sub-identifier of Chris' second text email, it determines whether the immediately preceding email to that email is accounted for in the email conversation data structure. This immediately preceding email would be the text email sent by Chris having a seq #1. If this immediately preceding email is not accounted for in the email conversation data structure, then the process described above may be repeated to recover that email. By repeatedly applying this discovery and recovery process, it is possible to recover multiple lost emails in the email conversation.

In the manner described, the EEP 104 is able to discover and recover lost emails. In the above example, a text email was recovered. Other types of emails (header, recipient list, subheading, attachment) may be recovered in a similar same manner.

In the case where the administrator is the person who is missing an email, the administrator may send a side mail to the participant who created and sent the missing email, and ask that participant to resend the email to the administrator as a side mail.

Email Management and Organization

In one embodiment, an EEP 104 may be used to receive, view, and organize all types of emails. This includes emails that are part of an email conversation (hereinafter referred to as conversation emails), and regular emails. If an email carries a unique identifier for an email conversation, then it is treated as a conversation email. If an email does not carry a unique identifier for an email conversation, then it is treated as a regular email. Used in this context, a regular email refers to: (1) an email originating from a user of any existing email system that does not have email conversation capability; or (2) an email originating from a user of an email system that has email conversation capability but the user has chosen not to send the email as a conversation email. In one embodiment, both conversation emails and regular emails may be organized and managed with a central display that provides for containers within which emails may be stored.

FIG. 5 is a block diagram that illustrates an embodiment of an email management approach. In FIG. 5, visual representations of containers within which emails may be stored are displayed. According to an embodiment, a container is a logical construct with which items such as emails may be associated, and by being so associated, be "stored within" the container. An example of a container is a folder. While the containers illustrated in FIG. 5 are hereinafter referred to as "folders," it should be understood that this is merely an example and is not to be considered as a limitation of any embodiment of the invention. Other types of containers may be used if so desired.

FIG. 5 shows an example display that a user may see when a user accesses his/her email account. The folders illustrated in FIG. 5 are displayed to the user for the purpose of organizing and managing conversation emails and regular emails. In one embodiment, four high level folders are provided: Inbox 501, Bulk Mail 524, Conversation Email 506, and Regular Email 527. These folders may have any desired number of subfolders within them.

When a new email arrives, it is sorted into one of two main folders: Inbox 501 and Bulk Mail 524. Bulk mail generally refers to mass marketed emails commonly known as "junk mail" or "spam." An email is classified as bulk mail if it meets certain user-specified criteria. These criteria may include, for example, certain email addresses, certain domain names, certain words in the subject header or the body of the email, etc. If an incoming email meets the bulk mail criteria set forth by the user, then it is automatically moved into the Bulk Mail folder 524. In one embodiment, the Bulk Mail folder 524 is divided into two sub folders: Notable 525 and All Other 526. The Notable folder 525 is used to store bulk mail that the user may find interesting. The All Other folder 526 is used to store all other bulk mail. With regard to the Notable folder 525, this folder may be used to store bulk email that the user may want to review at a later time. For example, a user may want to occasionally review shopping information or offers from certain vendors. The user does not want these emails to clutter the Inbox 501, but at the same time, the user may not want to automatically delete them. By causing them to be stored in the Notable folder 525, the user is able to prevent the clutter to the Inbox while keeping the option of reviewing the emails at a later time. In one embodiment, the user may specify subcriteria under the bulk mail criteria. If a bulk mail satisfies both the bulk mail criteria and the sub-criteria, then it is moved into the Notable folder 525. Otherwise, it is moved into the All Other folder 526.

In one embodiment, each of these folders 525, 526 has a user interface component shown as "[Empty]" next to it. If the user activates this user interface component (for example, by clicking on it), then the EEP 104 will delete all of the emails in the corresponding folder. This makes it simple for the user to dispose of unwanted mail.

If the incoming email is not classified as bulk mail, as described above, then the incoming email is automatically moved into the Inbox 501 where it falls into one of two subfolders, represented in FIG. 5 by Conversation Email 503 and Regular Email 504. If the incoming email carries a unique identifier and hence, is part of an email conversation, then the incoming email is stored in the Conversation Email subfolder 503. If the incoming email originated from an email management system that does not offer email conversation capability, or for whatever reason, the email does not carry a unique identifier, then the email is automatically stored in the Regular Email subfolder 504. The Conversation Email subfolder 503 may store conversation emails pertaining to multiple email conversations. For example, one set of emails in the Conversation Email subfolder 503 may pertain to a first email conversation while another set of emails may pertain to a second email conversation.

A user can view a listing of all of the emails in the Inbox 501 by clicking on Inbox 501. Unread emails as well as read emails contained in both the subfolders Conversation Email 503 and Regular Email 504 are displayed, listed chronologically under the subfolder Conversation Email 503 and listed chronologically under the subfolder Regular Email 504. If a user has read some emails and left them in the Inbox 501 without deleting them or moving them out, those read emails are displayed along with the unread emails. Read and unread emails may be made distinguishable by highlighting, bolding, using different colors, etc. In one embodiment, a display of emails may include a listing of emails providing some or all of the following data in a tabular format: date the email is sent and received, sender's name and email address, subject of the email, and other such data available with an email.

To view just the conversation emails in the Inbox 501, a user can click on the Conversation Email subfolder 503. This will cause a listing of both unread emails and previously read emails in the Conversation Email subfolder 503 to be displayed. Similarly, to view just the regular emails in the Inbox

501, a user can click on the Regular Email subfolder 504. This will cause a listing of both unread emails and previously read emails in the Regular Email subfolder 504 to be displayed.

A graphical user interface (GUI) element (n) 502 may be displayed next to any folder or subfolder. The number represented by the n within the parenthesis indicates the number of unread emails in that folder. For example, if Inbox 501 contains seventy emails but only ten are unread, then the (n) 502 displayed next to Inbox 501 will be shown as (10) to indicate that there are ten unread emails in Inbox 501. Similarly, if the Conversation Email subfolder 503 contains fifty emails but only five are unread, then the (n) 502 displayed next to the Conversation Email subfolder 503 will be shown as (5) to indicate that there are five unread emails in the Conversation Email subfolder 503.

In one embodiment, a GUI element 502 may be activated, for example by clicking on the number within the parenthesis. When a GUI element 502 is activated, the EEP 104 will: (1) access the folder that is associated with the particular GUI element 502 that has been activated; (2) determine which emails contained within that folder are unread; and (3) display information pertaining to only those unread emails to the user. For example, by selecting the display element (n) 502 next to the Inbox 501, a user can cause only the unread emails in the Inbox folder 501 to be displayed. This is in contrast to selecting the Inbox 501 itself, which would cause all of the emails in that folder, both read and unread, to be displayed. By activating a display element such as (n) 502 alongside a folder, a user can view only the unread emails in that folder without being distracted/hampered by the previously read emails in that folder.

In addition to the Inbox 501 and the Bulk Mail 524 folders, there is also provided an overall Conversation Email folder 506 and a Regular Email folder 527. These folders may contain any number of subfolders, and are intended to be used to store emails that have been moved out of the Inbox 501. The Conversation Email folder 506 (and its subfolders) is intended to store conversation emails that have been moved out of the Conversation Email subfolder 503 of the Inbox 501, and the Regular Email folder 527 (and its subfolders) is intended to store regular emails that have been moved out of the Regular Email subfolder 504 of the Inbox 501. With these two folders, conversation emails may be kept separately from regular emails. As shown in FIG. 5, these folders may comprise well known subfolders, such as Deleted subfolders 515, 531 for holding deleted emails, Draft subfolders 513, 530 for storing draft emails, a Sent subfolder 529 for storing previously sent emails, etc. They may also comprise folders (e.g. 509-512, 533-536) that are custom created and named by the user. The Conversation Email folder 506 may also comprise one or more folders (e.g. 518-523) used for archiving purposes. The use of these folders will be elaborated upon in a later section.

In one embodiment, when a user is viewing a listing of emails, the user may cause one or more reminders to be associated with an email (a read email or an unread email). In one embodiment, a user may associate a reminder with an email by selecting an email and then activating a user interface component to instruct the EEP 104 to associate a reminder with the selected email. In response to the invocation of this component, the EEP 104, in one embodiment, provides several user interface components. One interface component may be a drop down menu of options that were previously created by the user. For example, an active board member may have regular meetings that he attends or regular tasks that he performs (e.g. meet with chairman, meet with president, review sales report, etc.). Rather than hand-enter these items every time, the user may put these items into the drop down menu. That way, the user can simply select the desired meeting or task from the drop down menu the next time he/she wants to add a reminder. Another interface component that the EEP 104 may provide is a free format text field. This field allows the user to enter custom text for the reminder. In addition, the EEP 104 provides a field for entering a date and/or time to be associated with the reminder. The information in this field allows the EEP 104 to know when the reminder should be shown to the user. The processing of reminders will be elaborated upon in a later section.

Automatic Email Movement

As noted previously, one of the problems encountered in current email systems is that the inbox often gets cluttered with large numbers of emails. To reduce this clutter, a user can manually move emails out of the inbox into other folders (note: the EEP 104 does allow a user to manually move an email from one folder to another). However, this requires significant effort on the user's part. As a result, users often do not do it, and inboxes remain cluttered. To prevent the Inbox 501 from becoming cluttered, the EEP 104, in one embodiment, automatically moves emails out of the inbox into other folders once the emails have been read (this automatic email movement is optional and can be activated or deactivated by the user). The EEP 104 may move an email into a general folder, or into a particular folder specified by a user. Either way, the email is automatically moved out of the Inbox 501 into another folder without requiring any effort on the user's part. By automatically moving emails in this way, the EEP 104 keeps the Inbox 501 relatively clutter free.

In one embodiment, this automatic email movement feature may be applied to both regular emails and conversation emails. With regard to regular emails in the Regular Email subfolder 504 of the Inbox 501, they may be opened and read by a user in the usual manner. When the user closes the email after reading it, the EEP 104, in one embodiment, determines whether the automatic email movement feature has been activated. If it has not, then the email is just left in the Regular Email subfolder 504 of the Inbox 501. If the automatic email movement feature has been activated, then the EEP 104 proceeds to determine (e.g. via a user prompt) whether the user wishes to have the email moved to a specific folder. At that point, the user can navigate through the folder structure shown in FIG. 5 and select an existing folder under the Regular Email folder 527. Alternatively, the user can create a new folder under the Regular Email folder 527 and instruct the EEP 104 to move the email into that folder. As a further alternative, the user can instruct the EEP 104 to create a new folder under the Regular Email folder 527 and to move the email into that folder. If the user specifies a specific folder into which the email is to be moved, then the EEP 104 moves the email out of the Inbox 501 into that specific folder. If the user does not specify a specific folder, then the EEP 104 moves the email into a default folder (e.g. the Current subfolder 528 under the Regular Email folder 527). In either case, provided the automatic email movement feature has been activated, the regular email is moved out of the Inbox 501 into another folder without requiring the user to manually do so.

With regard to conversation emails, the EEP 104 may also apply the automatic email movement feature. However, the processing of conversation emails is carried out slightly differently. To illustrate how a conversation email may be automatically moved in accordance with one embodiment of the present invention, reference will be made to the following example, which is a continuation of the example used previously. Suppose that the participant named Mary is accessing her email account using an EEP 104. Suppose further that in the Conversation Email subfolder 503 of Mary's Inbox 501, there are two new emails pertaining to the email conversation shown in FIGS. 3 and 4 (these emails may be text, recipient list, subheading, or attachment emails). Suppose now that Mary instructs the EEP 104 to open one of the new emails. In response, the EEP 104 operates in the manner described previously. Specifically, in one embodiment, the EEP 104 opens the selected new email and updates the email conversation data structure with information pertaining to this new email (e.g. the new email's sub-identifier, date and time the email was opened, etc.). In addition, the EEP 104 opens the other new email pertaining to the email conversation and further updates the email conversation data structure with information pertaining to that new email (e.g. that new email's sub-identifier, date and time the email was opened, etc.). After the email conversation data structure is updated, the EEP 104 proceeds to generate the composite email for the email conversation. This composite email will include content extracted from the new emails, as well as content extracted from other emails that are already part of this email conversation. After generating the composite email, the EEP 104 displays it to Mary.

In one embodiment, the information extracted from the new emails may be shown in a different manner (e.g. highlighted, bolded, different color, etc.) than the information extracted from previous emails. This indicates to Mary that this is previously unread content. Each of the sets of information extracted from the new emails may also have a user interface component (e.g. a radio button or a check box) displayed next to it. This user interface component allows Mary to acknowledge reading each new email. Additionally, or as an alternative, the composite email display may provide a user interface component (e.g. a button) that allows Mary to acknowledge that all new emails have been read (that way, Mary does not have to acknowledge reading each individual email). These and other user interface components may be provided to enable Mary to acknowledge reading the new emails. In one embodiment, a distinction is made between a conversation email being "opened" and a conversation email being "read". A conversation email is considered to have been opened once the EEP 104 has opened that email and has updated the email conversation data structure with information pertaining to that email (as noted previously, a date and time opened may be stored in the email conversation data structure). A conversation email is considered to have been read only after a participant has acknowledged reading that email. Thus, an email (or more specifically, the content extracted from that email) may be shown to a participant in a composite email display several times and still be considered unread. Until the participant acknowledges reading that email, it is not deemed to be read. In one embodiment, the EEP 104 will not automatically move a conversation email out of the Inbox 501 into another folder until that conversation email has been acknowledged as having been read.

When viewing the composite email display, Mary may perform any number of operations. These operations may include, for example, acknowledging reading zero, one, or both of the new emails. If Mary acknowledges reading a new email, then the information in the email conversation data structure pertaining to that new email is updated to indicate that that new email has now been read. Also, Mary may invoke a user interface component to activate or deactivate the automatic email movement feature. In addition, Mary may invoke a user interface component to specify a particular folder into which all emails pertaining to this email conversation are to be moved. For example, Mary may create a new folder under the Conversation Email folder 506 named "Annual Sales Conference-2007" and instruct the EEP 104 to move all of the conversation emails that have been read for this email conversation into that folder. If such a folder is specified, then the email conversation data structure is updated to include a reference to that folder. Mary may perform these and other operations. At some point, Mary will be finished viewing the composite email, and will close the composite email.

When the composite email is closed (thereby causing all of the individual conversation emails to be closed), the EEP 104 performs a number of tasks. In one embodiment, these tasks include the following. Upon the closing of the composite email, the EEP 104 determines whether the automatic email movement feature has been activated. If not, then the EEP 104 simply leaves the emails pertaining to this email conversation in their current folder(s) (presumably, the Conversation Email subfolder 503 of the Inbox 501). However, if the automatic email movement feature has been activated, then the EEP 104 accesses the email conversation data structure for this email conversation, and determines whether a particular folder has been specified in that data structure as being the folder into which all emails for this email conversation are to be moved. If a folder is specified in the email conversation data structure, then that folder will be used. If a folder is not specified in the email conversation data structure, then the EEP 104 may ask Mary (e.g. through a user prompt) to specify a folder into which all emails for this email conversation are to be moved. At that point, Mary can navigate through the folder structure shown in FIG. 5 and select an existing folder under the Conversation Email folder 506. Alternatively, Mary can create a new folder under the Conversation Email folder 506 and instruct the EEP 104 to move the emails pertaining to this email conversation into that folder. As a further alternative, Mary can instruct the EEP 104 to create a new folder under the Conversation Email folder 506 and move the emails pertaining to this email conversation into that folder. If Mary specifies a particular folder, then that folder will be used (and the email conversation data structure will be updated to include a reference to that folder). If Mary does not specify a particular folder, then the EEP 104 will use a default folder. For example, the General subfolder 507 under the Conversation Email folder 506 may be used as the default folder for all conversation emails in which the participant (Mary in the current example) is named as a primary recipient or a sender. The CC subfolder 508 may be used as the default folder for all conversation emails in which the participant is named as a CC or BCC recipient.

In addition to determining the proper folder into which the conversation emails are to be moved, the EEP 104 also determines which emails in the email conversation should be moved. In one embodiment, the EEP 104 uses the email conversation data structure to make this determination. Specifically, the EEP 104 inspects the email conversation data structure to determine which of the emails referenced in the data structure have been read (as noted above, once an email is acknowledged as having been read, its information in the email conversation data structure is updated to indicate that it has been read). For each email in the email conversation that has been read, the EEP 104 automatically moves that email into the proper folder. If the email is already in the proper folder, then no movement is needed. The EEP 104 repeats this process until all read emails in the email conversation have been automatically moved to the proper folder. Thus, by the end of this process, all conversation emails pertaining to this email conversation that have been read will be stored in the proper folder. The next time a conversation email pertaining to this email conversation is opened, read, and closed, it will also be automatically moved from the Inbox 501 into the proper folder. Thus, without requiring any effort on the part of the participant (other than specifying the proper folder once for an email conversation), read emails in an email conversation are automatically moved into a certain folder. This automatic email movement feature, when activated, can serve to significantly reduce the amount of clutter in an email inbox.

In the examples given above, emails are described as being moved out of the Inbox 501 into another folder. It should be noted that this was for illustrative purposes only. The automatic email movement feature need not be applied only to emails in the Inbox 501. Rather, if so desired, it can be used to automatically move emails from any folder or folders into any other folder or folders. All possible applications are within the scope of the present invention.

Archiving of Conversation Emails

As discussed previously, an email conversation may comprise many individual emails, all associated with a unique identifier which is used to collect all the related content together in a single composite email. Over time, as the number of individual emails increases, archiving emails in an email conversation is a method of reducing this growing number of emails from being actively processed, resulting in faster processing and more efficient use of computing power and memory. In one embodiment, after an email in an email conversation is archived, it is no longer processed when a composite email for that email conversation is generated; thus, its content is no longer displayed in the composite email display.

In one embodiment, conversation emails may be archived in two ways: partial archive and full archive. A partial archive is applied to a subset of the individual emails comprising an email conversation and may be executed by a participant or by the administrator, while a full archive may be executed only by the administrator and archives all individual emails comprising an email conversation.

A partial archive may be initiated by any participant for his set of emails by opening an email in the email conversation, thereby causing a composite email to be generated, and activating a particular command. In one embodiment, the participant may specify particular criteria, which may, for example, include a date. These criteria determine which of the emails in the email conversation are to be archived. For example, if a date is specified, then all emails in the email conversation that were sent prior to that date should be archived. As an alternative, or in addition to, a user may select individual emails for partial archiving. In response to the partial archive command, the EEP 104 archives all individual emails in the email conversation that satisfy the specified criteria (or that have been selected to be archived). These emails are moved to a specified archive folder (for example, one of the archive subfolders 518-523 in FIG. 5). In addition, the email conversation data structure is updated to indicate that these emails are now archived. That way, the next time the EEP 104 uses the email conversation data structure to generate a composite email, it will not extract content from these archived emails.

A partial archive may also be initiated by the administrator of the email conversation, making the partial archive effective for all participants in the email conversation including himself. In one embodiment, to do so, the administrator invokes an EEP 104 to open one of the emails in the email conversation, which will cause a composite email for the email conversation to be generated. While viewing the composite email, the administrator may invoke a set of administrator commands to implement a partial archive. As part of this process, the administrator may specify certain criteria, such as a date, which will be used to determine which emails in the email conversation should be archived. As an alternative, or in addition to, the administrator may select individual emails in the composite email display for partial archiving. After the criteria are specified and/or individual emails are selected, the administrator instructs the EEP 104 to send out a "Partial Archive Notice" email to all of the participants of the email conversation. In one embodiment, this email contains the specified criteria and/or information indicating which individual emails have been selected for partial archiving, and all other information needed to implement the partial archiving (for example, the email may include one or more archiving instructions). It also carries the unique identifier for the email conversation.

When the "Partial Archive Notice" email is received and opened by a participant, it will be processed like other emails in the email conversation. Specifically, opening the email will cause an EEP 104 used by the participant to generate a composite email for the email conversation. That EEP 104 will recognize the email as a "Partial Archive Notice" email. In one embodiment, the partial archiving is carried out when the participant closes the composite email. In response to the participant closing the composite email, the EEP 104 proceeds to archive all of the individual emails in the email conversation that satisfy the criteria specified in the "Partial Archive Notice" email or that correspond to the individual emails specified in the "Partial Archive Notice" email. This archiving may be carried in the same manner as that described above in connection with participant-initiated partial archiving. Specifically, the emails to be archived are moved to a specified archive folder (for example, one of the archive subfolders 518-523 in FIG. 5). In addition, the email conversation data structure is updated to indicate that these emails are now archived. That way, the next time the EEP 104 uses the email conversation data structure to generate a composite email, it will not extract content from these archived emails. Once that is done, partial archiving is complete. No additional effort is required from the participant.

In one embodiment, the administrator's "Partial Archive Notice" email overrides any previously established partial archives by the participants. This operates to "undo" a participant's partial archive, and then execute the administrator's specified partial archive. The administrator's "Partial Archive Notice" partially archives the email conversation for the administrator also, in the same way it partially archives the email conversation for the other participants. Once the administrator issues a "Partial Archive Notice" to all of the participants in the email conversation, all participants then have an identical view of the same email conversation, because the same individual emails in the email conversation have been archived for all participants, regardless of what the participant may have partially archived previously.

In one embodiment, a participant may reset the dates for partially archiving the individual emails, and completely undo any other partial archive. By executing his own partial archive command, the participant's partial archive will be in effect until overridden by the next partial archive initiated by the administrator, or the user himself.

In normal displays, searches, and reports associated with an email conversation, when the participant accesses an email conversation, the partially archived emails resident in the archive folder are not accessed unless the participant so instructs. In one embodiment, when an email conversation is opened for display, the participant may specify partially archived individual emails to be included in the composite email display. For example, the participant may request partially archived emails to be displayed: (1) up to a participant specified date, or (2) within a range of dates, or (3) no date limits, to include all individual emails. The specification by the participant may be made effective whenever the email is opened, or made effective for that particular display only. Similarly, when executing a report or a search within emails, the participant is provided an option to include one, some or all partially archived emails and the report or the results of the search reflect both active individual emails and partially archived individual emails.

In one embodiment, only an administrator can fully archive an email conversation. The email conversation, identified by the unique identifier, is fully archived when the administrator decides to "close out" the email conversation. When an email conversation is fully archived, all the individual emails associated with the unique identifier are moved into an archive folder. As part of fully archiving an email conversation, the authorities of all the participants are modified so that no participant will any longer be able to respond to the email conversation or receive any emails pertaining to the email conversation; in effect, the email conversation is permanently closed.

In one embodiment, the administrator may fully archive an email conversation by creating and sending a "Full Archive Notice" email to one or more of the participants of the email conversation. If the administrator sends out the notice to one or more, but not all, of the participants of the email conversation, then the participants that receive the email will, in effect, be closed out of any further activity in the email conversation. They will not be able to send any replies to the email conversation and they will not be able to receive any emails pertaining to the email conversation. If the "Full Archive Notice" email is sent to all of the participants of the email conversation, then the email conversation will be fully closed and no participant will be able to send or receive any further emails in the email conversation.

In one embodiment, when the "Full Archive Notice" email is received and opened by a participant, it will be processed like other emails in the email conversation. Specifically, opening the email will cause an EEP 104 used by the participant to generate a composite email for the email conversation. That EEP 104 will recognize the email as a "Full Archive Notice" email. In one embodiment, the full archiving is carried out when the participant closes the composite email. In response to the participant closing the composite email, the EEP 104 proceeds to archive all of the individual emails in the email conversation. This may entail, for example, moving all of the emails in the email conversation to a specified archive folder (for example, one of the archive subfolders 518-523 in FIG. 5). In addition, the EEP 104 changes all of the authorities of all of the participants to indicate that none of the participants can any longer send or receive email pertaining to this email conversation. By doing so, the EEP 104 effectively closes out the email conversation for that participant. When all of the participants in the email conversation have opened the "Full Archive Notice" email, the overall email conversation will be fully closed. This is true even for the administrator. After an email conversation is fully archived, even the administrator will no longer be able to send or receive emails pertaining to that email conversation.

In one embodiment, the administrator may schedule the full archiving by designating, in the "Full Archive Notice" email, a specific time at which the full archiving is to take place. This allows time for the email conversation participants to exchange some last minute emails if they so desire. For example, the administrator could, in the "Full Archive Notice" email, specify that the full archiving will take place at a certain time in the future. Before that exact time, every participant has an opportunity to participate in the email conversation and continue all email activities in accordance with the authorization given to them. At the time specified by the administrator, without any intervention or effort by a participant or the administrator, the full archiving will be implemented for the email conversation.

According to an embodiment, an email conversation may be deleted only after it has been fully archived, as described above. Once an email conversation is fully archived, it can be selected from an archive folder and deleted. In one embodiment, the deleted email moves to the Deleted subfolder 515, and if deleted again from this folder, the email is removed from any further access.

Labels

In many situations, an email user may receive a large number of new emails at one time. For example, if a user has been away on vacation and did not have access to email during the vacation, the user may return to an inbox with a large number of new emails. With the high volume of emails, the user may have difficulty finding the important emails that require immediate attention. For example, the user may have an important email from the president of the company but that email may be buried in the middle of the rest of the emails. Because of this, the user may not see or respond to the email in a timely fashion.

To help the user sift through a large number of emails and pick out the ones that he is interested in, one embodiment of the present invention introduces the notion of a "label". A label may be thought of as a sorting mechanism. Each label has a set of one or more filtering criteria associated therewith, and each label may be used as a bin or a bucket to store references to emails that meet the specified filtering criteria. Examples of filtering criteria include but are not limited to: email address of sender, domain name of sender's email address, key words in subject field or body of email, date email was sent, whether an attachment was attached to the email, etc.

In one embodiment, a label is different from a folder. A folder is a container within which one or more emails are stored. For example, the Inbox 501 (FIG. 5) is a folder and one or more emails are stored within the Inbox folder 501. In contrast, a label is not used to store an email. Rather, a label stores a reference to an email. The email remains in the folder (e.g. the Inbox 501) in which it is stored. The label just stores a reference to that email in that particular folder.

To illustrate how labels may be used in accordance with one embodiment of the present invention, reference will be made to the example shown in FIG. 5. In the following example, for the sake of simplicity, only a few labels are shown. It should be noted, however, that the present invention may accommodate any number of labels. As shown in FIG. 5, a set of labels is specified within a labels portion 505 of a display (the labels portion 505 is named "IMPORTANT NEW EMAILS" in the current example). These labels include a President label, a Company Email label, and a Family label. As noted above, each label has a set of filtering criteria associated therewith. In this example, the filtering criterion for the President label may be the email address of the president of the company (this will cause emails sent by the president of the company to be captured by the label). The filtering criterion for the Company Email label may be the domain name of the company (this will cause emails sent by people having the company's domain name in their email address to be captured by the label; this label will basically capture all intra-company emails). The filtering criteria for the Family label may be the email addresses of the user's family members (this will cause emails sent by family members to be captured by the label). In the current example, the labels are applied to the Inbox 501; thus, the filtering criteria of the labels will be applied to the emails (both read and unread, and both conversation and regular) that are stored in the Inbox 501.

To illustrate how the labels may be populated with information, reference will be made to the following example which, in one embodiment, would be implemented by an EEP 104. As emails are received by the EEP 104, if they are not classified as bulk mail, they are stored in the Inbox folder 501. Suppose now that the Inbox 501 contains an email from the president of the company. This email satisfies the filtering criterion of the President label; thus, a reference to this email will be stored in association with the President label. This email also satisfies the filtering criterion of the Company Email label (assuming the president sent the email using his work email address). Thus, a reference to this email will also be stored in association with the Company Email label (note: the email references stored in various labels need not be mutually exclusive; put another way, multiple labels may store the same reference to the same email in the same folder).

Suppose that the Inbox 501 also contains an email from a co-worker. This email satisfies the filtering criterion of the Company Email label (assuming the co-worker sent the email using his work email address). Thus, a reference to this email will be stored in association with the Company Email label. Suppose further that the Inbox 501 further contains an email from the user's spouse. This email satisfies the filtering criteria of the Family label. Thus, a reference to this email will be stored in association with the Family label. Finally, suppose that the Inbox 501 further contains an email sent by a friend who is not the president of the company or a co-worker. This email would not satisfy the filtering criteria for any of the labels. Thus, a reference to this email would not be stored in association with any of the labels. As this example shows, the labels separate the emails in the Inbox 501 into defined groups. From these groups, the user will be able to easily select the emails in which he is interested.

When the user activates one of the labels, (e.g. by clicking on the name of the label), information pertaining to all of the emails in the Inbox 501 that satisfy the filtering criteria for that label will be displayed. This may include both read and unread emails. Thus, if the user clicks on the President label, information pertaining to all of the emails in the Inbox 501 that were sent by the president of the company would be displayed. When information pertaining to an email is displayed, the user may instruct the EEP 104 to open that email. At that point, the EEP 104 would access the email in the Inbox 501 and open it. If the email is a regular email, it is opened in the usual manner. If the email is a conversation email, then some special processing may need to be performed. This will be elaborated upon in a later section.

A GUI element (n) may be displayed next to each label, as shown. The number represented by the n within the parenthesis indicates the number of unread emails associated with that label. For example, if the President label stores references to ten emails in the Inbox 501 but only five of those emails are unread, then the (n) displayed next to the President label would be shown as (5). In one embodiment, a GUI element (n) may be activated, for example by clicking on the number within the parenthesis. When a GUI element (n) is activated, the EEP 104 will: (1) determine which emails are referenced by the label that is associated with the particular GUI element (n) that has been activated; (2) determine which of those emails are unread; and (3) display information pertaining to only those unread emails to the user. For example, by selecting the display element (n) next to the President label, a user can cause only the unread emails in the Inbox folder 501 that are from the president of the company to be displayed. By activating a GUI element (n) alongside a label, a user can view only the unread emails referenced by that label without being distracted/hampered by the previously read emails that are also referenced by that label.

As noted above, when a conversation email is opened via a label, some special processing may need to be performed. To illustrate this processing, reference will be made to the following example. Suppose that the Conversation Email sub-folder 503 of the Inbox 501 currently contains four new conversation emails pertaining to a certain email conversation. One of these emails is from the president of the company, and the other three are from various other participants. Given this scenario, the President label will comprise a reference to the new email from the president of the company.

Suppose now that the user activates the GUI element (n) next to the President label. This will cause information pertaining to the new email sent by the president of the company to be displayed. Suppose further that the user instructs the EEP 104 to open that new email. As described previously, opening an email in an email conversation usually causes all of the emails in the email conversation to be opened. This would include both previously opened emails and previously unopened emails. Thus, under normal circumstances, opening the new email from the president would also cause the other three new emails to be opened. However, in this case, the new email from the president is being opened from the President label. That being the case, the user may not want to see all new emails in the email conversation but rather only new emails from the president. Put another way, the user may want to see only the new emails in the email conversation that meet the specified criteria for the label.

To determine the user's wishes, the EEP 104, in one embodiment, asks the user whether the user wants to view all new emails in the email conversation or just new emails that meet the specified criteria for the label. If the user indicates that he wishes to see all new emails in the emails conversation, then the EEP 104 will operate in the manner previously described. Specifically, the EEP 104 will open all of the emails in the email conversation (including the new email from the president, the other three new emails, and previously opened emails) and generate a composite email for the email conversation. On the other hand, if the user indicates that he wishes to view only new emails in the email conversation that meet the specified criteria for the label, then the EEP 104 will open only those new emails, along with previously opened emails in the email conversation, and use the information extracted therefrom to generate the composite email. In the current example, this would mean that the EEP 104 would open only the new email sent by the president (and not the other three emails sent by the other participants), along with previously opened emails in the email conversation, and generate a composite email for the email conversation from the information extracted therefrom. By excluding the other new emails from the composite email, the EEP 104 allows the user to focus on just the new emails that meet the specified criteria for the label, and prevents the user from being distracted by the other new emails in the email conversation.

In the manner described above, emails may be classified using labels, and may be accessed through labels.

Sequential Emails and Attachments

Often, there are situations where proposals, drafts, reviews, paper forms or applications are checked sequentially by one staff person, then another and then another, and finally by a ranked person who makes a final decision. For example, an application for employment may require the submission of various papers, certificates, and so on. One staff person checks the application for completeness, including signature, of all required materials. The next person may attach a credit report obtained by use of the applicant's social security number, another person calls previous employers for references, and so on. Each subsequent step requires some effort, and the effort may be wasted if the previous step is not completed and approved. Hence, because of dependence of each step on the previous step, the steps are completed sequentially.

In one embodiment, a sequential attachment approach allows for a sequential work flow, as described above. Using an EEP 104, an administrator prepares an initial email to create an email conversation, and while attaching one or more files, the administrator defines the one or more attached files as a sequential attachment. The administrator then specifies (a) a list of recipients that are to review the attachment in sequence, and (b) the recipients' sequence of review. For example, a person in the personnel department of a company may create an email conversation that includes an attached employment application as a PDF file attachment. It could be in the form of a PDF form completed by the applicant from any remote location, or a paper form that the personnel department scans and converts into a PDF file. The entire applicant's information is included in the attachment and a header form to be completed by three staff persons with their comments is also added as a first page to the attachment. The administrator (creator) of the email conversation attaches the PDF file, specifies the attachment and email conversation as sequential, and lists the three recipients by whom the form must be reviewed and in what order, and sends the email. When the email is sent, the EEP 104 used by the administrator determines that the email conversation is sequential, determines who the first designated recipient should be, and sends the initial email to just that recipient (recall that the initial email is actually sent as a plurality of emails (e.g. text email, recipient list email, and attachment email).

When the first recipient, using an EEP 104, opens one of the emails, the EEP 104 generates a composite email in the manner described previously and displays the composite email to the recipient. The recipient checks the attachment for completeness and signature, writes comments in the text area of the composite email display and/or in the first page of the PDF file, which may be an attachment or a link to a file on the corporate website, approves it and simply sends it out as a reply. When the reply is sent, the EEP 104 used by the recipient determines that the current email conversation is sequential, determines who the next recipient should be, and sends the reply to that recipient. In one embodiment, the reply is also sent to the administrator, who can automatically have the progress of the sequential email conversation monitored.

When the second recipient, using an EEP 104, opens the reply, the EEP 104 generates a composite email in the manner described previously and displays the composite email to the second recipient. That recipient performs his designated task and makes his entry in the form, and sends out another reply. When this reply is sent, the EEP 104 used by the second recipient determines that the current email conversation is sequential, determines who the next recipient should be, and sends the reply to that recipient. Again, the reply is also sent to the administrator. At each step, the recipients may make their final assessments known in the text area of the composite email display, noting any exceptions, or delays, or additional useful comments. Each subsequent recipient of the email conversation may determine from this information whether the previous person has approved the application so far, and the recipient may either proceed with his assigned function, or send the email conversation back to the administrator for action, for example in the form of a text side mail with a question or comment in the text area. When the problem is resolved, the administrator can send a reply to the text side mail asking for the review to continue. Thus, exceptions can be dealt with, approvals and comments can be made, and the administrator can stop or re-start the email sequence at any time, without losing the entries in the PDF attachment, and without losing the history of comments in the email conversation.

In a final step, when all three recipients have recorded and emailed their approvals, the administrator may enter another recipient on the list, for example, a department head who will make the decision to hire, and then send out the completed employment application for a final decision.

In another example, an applicant may send a form or request, and a series of procedural steps performed by more than one person are required to process the form or request, such as: employment applications, insurance applications and insurance claims, school or college admission applications, applications for opening bank accounts, applications to government regulatory agencies for permits, licenses, approvals, and so on. In other examples, documents may need to be reviewed in sequence, such as the following: a legal contract may be reviewed by several junior lawyers before final preparation by a senior lawyer and approval by a firm's partner; a student's thesis may be reviewed by peers and junior professors before a final review by a department head; and finally, an agenda for a forthcoming meeting may be reviewed by several members of a committee before a final decision made by the committee chairperson.

In one embodiment, a sequential flow of email conversation replies without any attachment may be designated. Each recipient in the email conversation, starting with the first, sends a reply which automatically goes to the next person on the list as well as to the administrator, and the next person receiving the reply sends a reply that goes to the next person on the list as well as to the administrator; a reply to another recipient would not be permitted. An administrator may resend the email to anyone else, whether on the recipient list or not, and then have that recipient follow a defined sequence.

In one embodiment, a sequence may comprise a list of recipients in a prescribed order or groups of recipients where the prescribed order may be, for example, any one recipient in the first group followed by any one recipient in the second group followed by any one recipient in the third group, and so on. A group may be any number of recipients. Options may be defined that also allow an administrator to specify a sequence for the email flow by defining any one recipient in a group followed by all recipients in the next group in a pre-determined order, or by always having the email sent back to the administrator where the administrator may then determine which recipient should get any particular email for the next part of the sequence. These and other enhancements/modifications are within the scope of the present invention.

Reminders

As described previously, one or more reminders may be associated with an email. A reminder may be associated with an email by opening an email and associating a reminder with a certain portion of the email. A reminder may also be associated with the overall email itself, with or without opening the email. For each reminder, a user may optionally specify a reminder date and optionally provide some reminder text (the user has to provide at least one of these). The reminder date is used to alert the user of past reminders, current reminders, and upcoming reminders. The reminder text provides some additional context for the reminder (this is in addition to the email with which the reminder is associated). Some examples of text reminders with dates are: "Reply with revised attachment file—by Jan. 15, 2006", "Send these photographs to Jeremy—by Jan. 16, 2006", "Send agenda for Project Meeting—Jan. 22, 2006"; other examples of text reminders without dates are: "Send my comments on the draft to all in project team", "Make appointment with Purchase Manager of XYZ Company and inform John", and "Call Jane to set up lunch soon". The reminders described herein can be linked to a calendar of appointments and notes that are not part of the EEP 104. A user can plan his work by combining tasks such as meetings, appointments, and so on from a calendar with the tasks and other reminders (examples given in this section) that arise out of email correspondence, and by using various reports and displays (by heading, by current day, by next day, by week, etc) to see the calendar plus email reminders together. All the tasks, activities, etc. from the calendar as well as reminders from emails can be linked from the EEP 104, so the user can plan comprehensive work agendas for himself.

Figure 6:
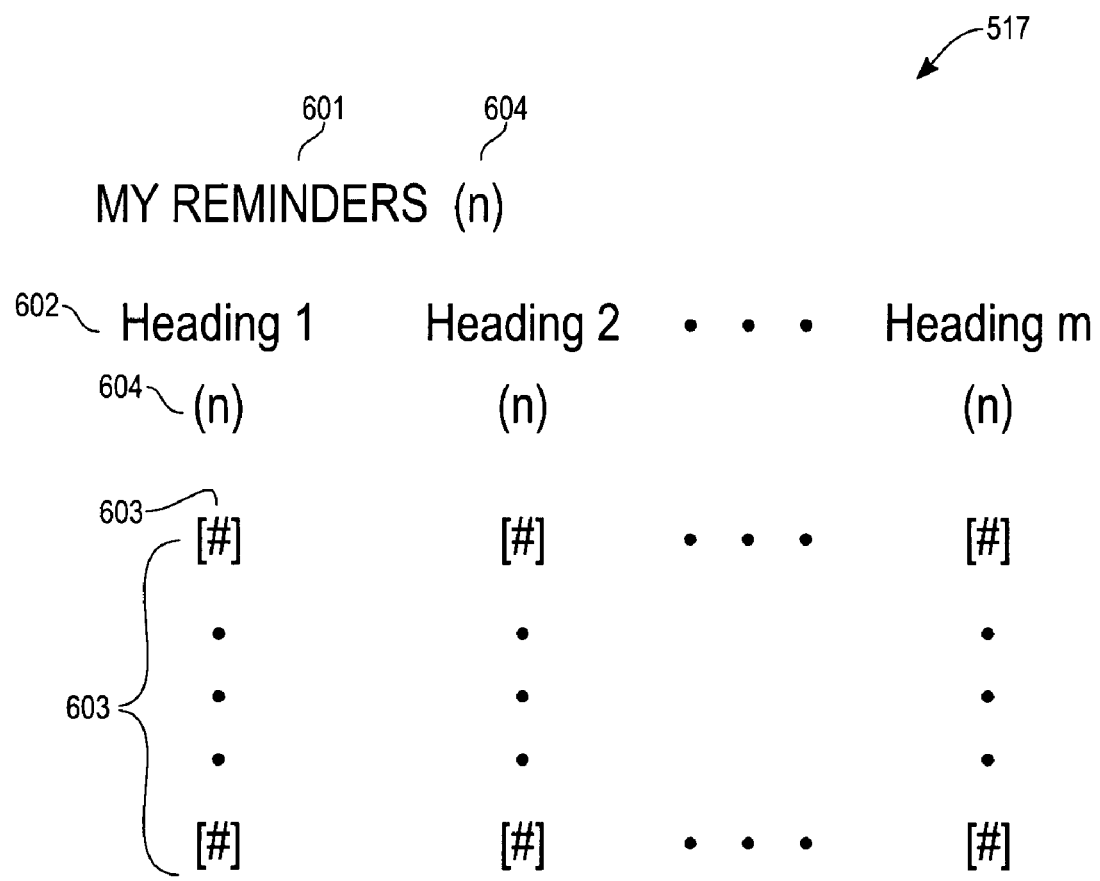
FIG. 6 how reminders associated with emails may be presented to a user in accordance with one embodiment of the present invention.

FIG. 6 shows how reminders may be presented by an EEP 104 to a user in accordance with one embodiment of the present invention. FIG. 6 is a more detailed drawing of the box labeled 517 in FIG. 5. In FIG. 6, the title "MY REMINDERS" 601 is a user defined title for the reminders section of the display. A user has options to name this section in accordance with the user's own choice of words. Some other examples for titles are: "Important Reminders", "Email Reminders", "My Priority List", and "My Deadlines". The title and the features (described below) available under this title may be applied to any of the folders shown in FIG. 5.

The reminders section 517 comprises a plurality of headings 602, which act as column headings, and a plurality of rows 606. Each row corresponds to a particular folder. For example, one row may correspond to the General Subfolder 507 of FIG. 5, while another row may correspond to the Deleted subfolder 515. Each heading 602 has a date oriented rule associated therewith. Depending on the date associated with a reminder, and the folder in which the email associated with that reminder is stored, the reminder will be slotted under one of the headings in one of the rows.

There are several possible ways that the user may want to organize his reminders: by date, by day of week, and other useful ways to state days such as: today, tomorrow, this week, next week, and so on. The user can create any number of headings 602, naming them in a meaningful manner and associating a mathematical operation with each heading to operate on the date specified in the reminders. For example, heading1 may be labeled "Today" and may have a mathematical operation associated therewith that captures emails with reminders that have a reminder date that falls on the current date. Heading 2 may be labeled "Tomorrow" and may have a mathematical operation associated therewith that captures emails with reminders that have a reminder date that falls on the current date plus one day. The user has great freedom in naming the headings 602 and associating mathematical operations with the headings.

The symbol [#] 603 shows the number of emails that have reminders in the folder corresponding to a particular row, and matching the mathematical formula under the user-defined heading. For example, if a particular folder has one email that has a reminder, and that reminder has a date that falls under heading1, then the [#] shown for the row that corresponds to that folder in the heading1 column will be [1]. The display of [#] 603 will be a number 1 or greater than 1. If the user clicks on a particular [#], then only the emails that have reminders from the associated folder will be displayed along with the reminder associated with the email; other emails of the folder will not be displayed. If the user clicks on (n) 604 associated with any heading 602, then all the emails with reminders from all the folders under that heading are displayed—in effect, all the emails in all the [#]'s under that heading are displayed; other emails from the folders are not displayed. The display shows emails in ascending or descending order of date received as specified by the user. If the user has made the reminder without a date, the user will need to create one heading where the date operation is not used. The first three examples in the table that will be discussed below show headings where the date is not specified in the reminder.

As noted above, when a user clicks on a particular [#] 603, all the emails having reminders in the associated folder and matching the date based rule of the heading are displayed; along with each email displayed, the entire reminder is displayed (multiple reminders in case a user has made more than one reminder), with the reminder text and the reminder date. The display indicates if the reminder was made after opening the email, and if so, the user can, by clicking on this indicator, go directly to the point of the email where the user made the reminder. An option is provided to see the other reminders in this folder—across all headings. Finally, the user is provided an option to open the conversation email. If the user opens the email, the reminder is also conveniently displayed in a bubble for the entire time the user keeps the email open. Thus, the user can, in the same display, view the conversation email, the position in the email where the reminder was made, and the reminder itself.

Adjacent to the title "MY REMINDERS" 601 is a GUI element (n) 604. This GUI element (n) 604 can be clicked upon to display all the emails that have reminders, across all folders and grouped logically by heading. Thus, clicking (n) 604 alongside the title 601 displays all the emails with reminders across all folders, grouped by heading. Clicking on (n) 604 associated with a particular heading 602 gives a display of all reminders in emails across all folders, but pertaining to that particular heading only and no other heading. Finally, clicking on (#) under a heading displays reminders of emails for only the folder associated with (#) as shown across, and only for that heading, and no other folder and no other heading.

The user has several options to name the headings, and associate a date based rule with the heading. The user is provided with an option to include a day or date or both in the heading display. For example, a heading of "Today" could be followed by "Mon 1/15" or "Jan 15", and "Tomorrow" followed by "1/16" or "Tues Jan 16", and so on. Several examples of defining headings and the mathematical rules used to identify the date used in the note are listed below in the tables. In the reminder, the user enters the date associated with the reminder (time is an additional option), whereas the heading contains the rule for using the entered date. Shown below are several examples of using the entered date in various headings.

| | User Defined Heading | Date Based Rule to be Applied |
|---|---|---|
| (1) | Important, Work | No date operand |
| | Important, Personal | No date operand |
| | My To Do List | No date operand |

-continued

| User Defined Heading | Date Based Rule to be Applied |
|---|---|
| Do ASAP | No date operand |
| Today | Current date |
| Tomorrow | Current Date + 1 |
| Day After Tomorrow | Current Date + 2 |
| Next Day | Current Date + 3 |
| Today or Tomorrow | Current Date or (Current Date + 1) |
| Next Day | Current Date + 4 |
| Next Day | Current Date + 5 |
| Next 3 Days | (Current Date + 1) or (Current Date + 2) or (Current Date + 3) |
| Next 5 Days | Same as above for Dates +1 to +5 |
| Next 6-10 Days | Same as above for Dates +6 to +10 |
| Next 11-15 Days | Same as above for Dates +11 to +15 |
| Next 16-30 Days | Same as above for Dates +16 to +30 |
| Past Due 1 Day | Current Date − 1 |
| Past Due 2 Days | Current Date − 2 |
| Past Due 3 Days | Current Date − 3 |
| Past Due 4 Days | Current Date − 4 |
| Past Due 5 Days | Current Date − 5 |
| Past Due > 2 Days | Earlier than Current Date − 2 |
| Past Due > 3 Days | Earlier than Current Date − 3 |
| Past Due > 4 Days | Earlier than Current Date − 4 |
| Past Due > 5 Days | Earlier than Current Date − 5 |

In the above examples under, Today is defined as Current Date, and changes dynamically the next day, and every day thereafter.

Another way the user can name the headings and define rules is by using days of the week, as shown below. In this example, the user sets up two weeks: current week and next week; and on every Monday (or other user-defined day of the week), the current and next week are redefined, with the previous next week moving into the current week category, and a new set of seven days forming next week.

| (2) | Monday | Monday in Current Week |
| | Tuesday | Tuesday in Current Week |
| | Wednesday | Wednesday in Current Week |
| | Thursday | Thursday in Current Week |
| | Friday | Friday in Current Week |
| | This Weekend | Saturday or Sunday in Current Week |
| | Next Monday | Monday in Next Week |
| | Next Tuesday | Tuesday in Next Week |
| | Next Wednesday | First Wednesday in Next Week |
| | Next Thursday | Thursday in Next Week |
| | Next Friday | Friday in Next Week |
| | Next Weekend | Saturday or Sunday in Next Week |

The number of headings 602 available for the user to define is limited only by the user's display size (monitor screen size, font size, and so on). In addition, the user can define some headings from (1) above and some from (2) above, depending on the user's own particular needs. In all cases, the user has options to add the day and date in the display of headings, if the user so wishes.

As mentioned above, the reminder has a date field associated with it. This date field can be used in any mathematical operation. Some of the useful rules are shown above. As shown in the figures seen together (FIG. 5+FIG. 6), the [#] used to indicate the number of emails with reminders is displayed for emails in Drafts folders 513 because the user may wish to add a reminder to the draft email contained in the Draft folder. Reminders may also be displayed for deleted emails in the Deleted folder 515—to remind the user that a valid reminder exists in a deleted email. If the user creates a reminder for an email, the reminder moves with the email, as the email may be moved by the user from one folder to another.

Hardware Overview

Figure 7:
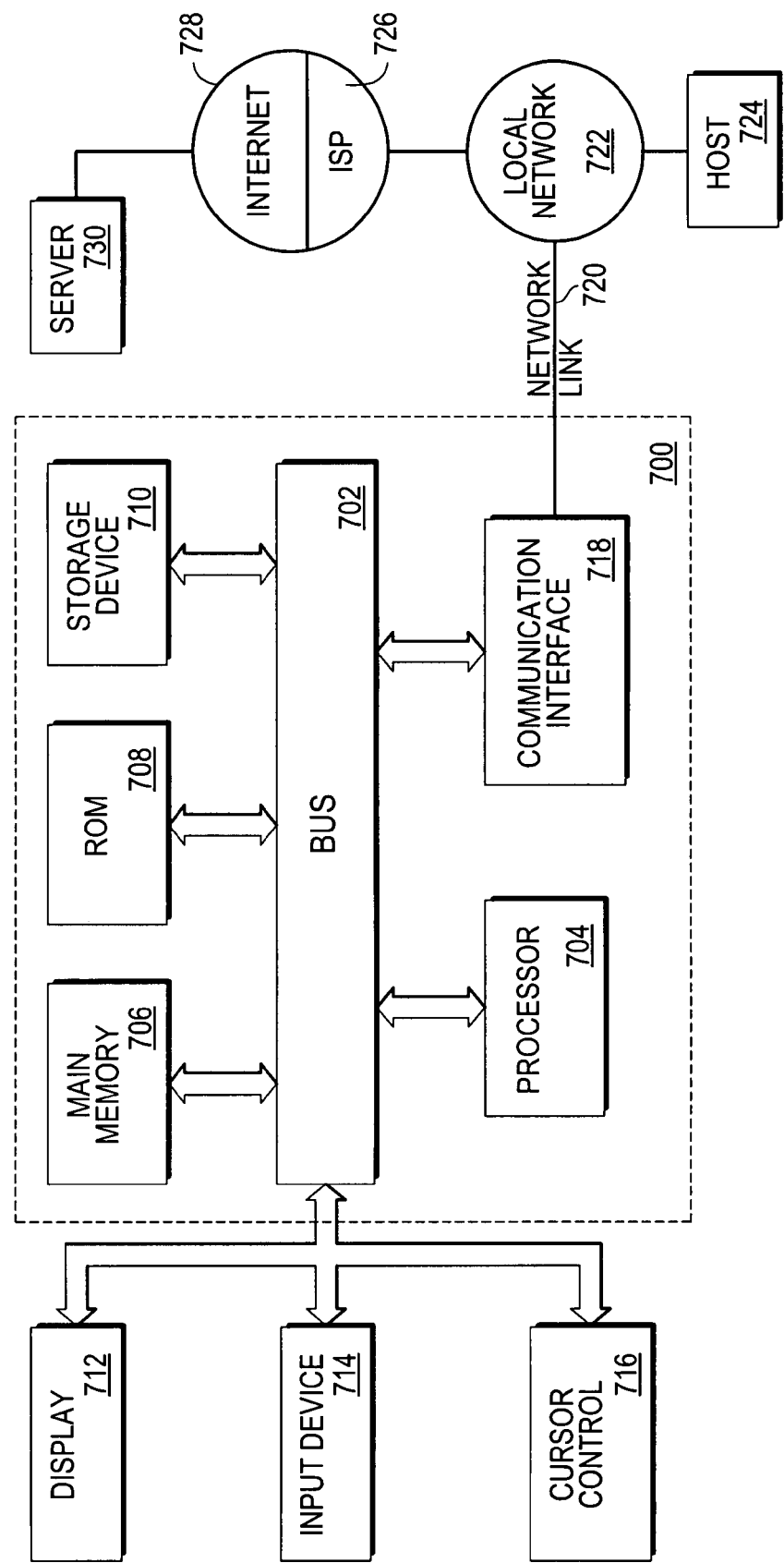
FIG. 7 is a block diagram of a general purpose computer system in which one embodiment of the present invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In one embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine implemented method, comprising:
   receiving user input from a user;
   in response to the user input, accessing a particular electronic mail message (email) that is part of an email conversation, wherein the email conversation spans across a plurality of separate emails, and all emails that are part of the email conversation have a unique identifier associated therewith;
   extracting the unique identifier from the particular email;
   accessing, based at least partially upon the unique identifier, an email conversation data structure that is associated with the email conversation, the email conversation data structure containing information indicating which emails are part of the email conversation;
   accessing at least a subset of the emails that are indicated by the email conversation data structure as being part of the email conversation;
   automatically generating a composite email which includes content from the particular email and the subset of emails;
   extracting, from the particular email or one of the emails in the subset of emails, authorization information indicating what the user can and/or cannot do with respect to the email conversation; and
   enforcing any restrictions indicated by the authorization information to ensure that the user is not allowed to perform any operation with respect to the email conversation for which the user has not been authorized;
   wherein the method is performed by one or more computing devices.

2. The method of claim 1, wherein the particular email is an email that has not been previously accessed, and wherein the method further comprises:
   updating the email conversation data structure to indicate that the particular email is part of the email conversation.

3. The method of claim 2, wherein the particular email has a sub-identifier associated therewith which uniquely identifies the particular email within the email conversation, and wherein updating the email conversation data structure comprises:
   updating the email conversation data structure with information obtained from the sub-identifier.

4. The method of claim 3, wherein the information obtained from the sub-identifier comprises: (a) an indication of which participant in the email conversation sent the particular email; and (b) a sequence indicator indicating an order in which the particular email was sent by that participant relative to other emails sent by that participant in the email conversation.

5. A non-signal machine readable storage medium having stored thereon instructions, which when executed by one or more processors, cause the one or more processors to perform the method of claim 4.

6. The method of claim 3, wherein the information obtained from the sub-identifier comprises: (a) an indication of an email type for the particular email; (b) an indication of which participant in the email conversation sent the particular email; and (c) a sequence indicator indicating an order in which the particular email was sent by that participant relative to other emails of the same email type sent by that participant in the email conversation.

7. The method of claim 1, further comprising:
determining whether any previously unaccessed emails have the unique identifier associated therewith; and
in response to a determination that one or more previously unaccessed emails have the unique identifier associated therewith, updating the email conversation data structure to indicate that the one or more previously unaccessed emails are part of the email conversation.

8. The method of claim 7, wherein each of the one or more previously unaccessed emails has a sub-identifier associated therewith which uniquely identifies that email within the email conversation, and wherein updating the email conversation data structure comprises:
updating the email conversation data structure with information obtained from the sub-identifier of each of the one or more previously unaccessed emails.

9. The method of claim 8, wherein the information obtained from the sub-identifier of each of the one or more previously unaccessed emails comprises: (a) an indication of which participant in the email conversation sent that previously unaccessed email; and (b) a sequence indicator indicating an order in which that previously unaccessed email was sent by that participant relative to other emails sent by that participant in the email conversation.

10. A non-signal machine readable storage medium having stored thereon instructions, which when executed by one or more processors, cause the one or more processors to perform the method of claim 9.

11. The method of claim 8, wherein the information obtained from the sub-identifier of each of the one or more previously unaccessed emails comprises: (a) an indication of an email type for that previously unaccessed email; (b) an indication of which participant in the email conversation sent that previously unaccessed email; and (c) a sequence indicator indicating an order in which that previously unaccessed email was sent by that participant relative to other emails of the same email type sent by that participant in the email conversation.

12. The method of claim 1, wherein the email conversation data structure comprises a set of information for each email that is part of the email conversation, and wherein the set of information for each email comprises: (a) an indication of which participant in the email conversation sent that email; and (b) a sequence indicator indicating an order in which that email was sent by that participant relative to other emails sent by that participant in the email conversation.

13. A non-signal machine readable storage medium having stored thereon instructions, which when executed by one or more processors, cause the one or more processors to perform the method of claim 12.

14. The method of claim 1, wherein the email conversation data structure comprises a set of information for each email that is part of the email conversation, and wherein the set of information for each email comprises: (a) an indication of an email type for that email; (b) an indication of which participant in the email conversation sent that email; and (c) a sequence indicator indicating an order in which that email was sent by that participant relative to other emails of the same email type sent by that participant in the email conversation.

15. The method of claim 1, wherein the email conversation data structure comprises a set of information for each email that is part of the email conversation, and wherein the set of information for each email comprises information indicating whether that email should be accessed and content extracted therefrom the next time the composite email is generated.

16. A non-signal machine readable storage medium having stored thereon instructions, which when executed by one or more processors, cause the one or more processors to perform the method of claim 15.

17. The method of claim 1, wherein enforcing comprises:
receiving an indication that the user wishes to perform a particular operation with respect to the email conversation;
determining, based at least partially upon the authorization information, whether the user is authorized to perform the particular operation; and
in response to a determination that the user is not authorized to perform the particular operation, disallowing performance of the particular operation.

18. A non-signal machine readable storage medium having stored thereon instructions, which when executed by one or more processors, cause the one or more processors to perform the method of claim 17.

19. The method of claim 1, wherein enforcing comprises:
determining, based at least partially upon the authorization information, one or more operations that the user is not authorized to perform with respect to the email conversation; and
deactivating one or more user interface components to prevent the user from performing the one or more operations.

20. A non-signal machine readable storage medium having stored thereon instructions, which when executed by one or more processors, cause the one or more processors to perform the method of claim 19.

21. The method of claim 1, wherein the authorization information is extracted from a recipient list email that specifies a list of participants participating in the email conversation, and wherein the list of participants is extracted from the recipient list email and included in a recipient list portion of the composite email.

22. The method of claim 21, wherein the email conversation comprises a text email containing a text message, and wherein the text message is extracted from the text email and included in a text portion of the composite email.

23. The method of claim 22, wherein the email conversation comprises a subheading email containing a sub topic to be discussed in the email conversation, and wherein the sub topic is extracted from the subheading email and included in a subheading portion of the composite email.

24. The method of claim 23, wherein the email conversation comprises a header email containing header information for the email conversation, wherein the header information comprises an overall topic to be discussed in the email conversation, and wherein the header information is extracted from the header email and included in a header portion of the composite email.

25. The method of claim 24, wherein the header information further comprises information indicating which participant in the email conversation initiated the email conversation, and information indicating when the email conversation was initiated.

26. The method of claim 22, wherein the email conversation comprises an attachment email comprising attachment information, wherein the attachment information comprises one or more attached files to be associated with the email conversation and information describing the one or more attached files, and wherein at least the information describing the one or more attached files is extracted from the fourth attachment email and included in an attachments portion of the composite email.

27. The method of claim 24, wherein the sub topic contained in the subheading email is a sub topic under the overall topic contained in the header email.

28. The method of claim 1, wherein a first email and a second email are part of the email conversation, wherein the first email is a first recipient list email that specifies a first list of participants participating in the email conversation, wherein the second email is a second recipient list email that specifies a revised list of participants participating in the email conversation, wherein the revised list of participants is extracted from the second email, and wherein only the revised list of participants, and not the first list of participants, is included in a recipient list portion of the composite email.

29. The method of claim 1, wherein the email conversation data structure indicates that a certain email is part of the email conversation, wherein the email conversation data structure contains indication information indicating whether the certain email should be accessed when generating the composite email, and wherein accessing at least a subset of the emails that are indicated by the email conversation data structure as being part of the email conversation comprises:
  determining, based upon the indication information in the email conversation data structure, whether the certain email should be accessed when generating the composite email;
  in response to a determination that the certain email should not be accessed, foregoing accessing of the certain email; and
  in response to a determination that the certain email should be accessed, accessing the certain email so that the certain email is included as one of the subset of emails.

30. A non-signal machine readable storage medium having stored thereon instructions, which when executed by one or more processors, cause the one or more processors to perform the method of claim 29.

31. The method of claim 1, wherein the email conversation data structure contains one or more selection criteria which can be used to determine which emails in the email conversation should be accessed when generating a composite email, and wherein accessing at least a subset of the emails that are indicated by the email conversation data structure as being part of the email conversation comprises:
  applying the one or more selection criteria to the emails in the email conversation to determine which emails in the email conversation should be accessed when generating the composite email for the email conversation.

32. A non-signal machine readable storage medium having stored thereon instructions, which when executed by one or more processors, cause the one or more processors to perform the method of claim 31.

33. The method of claim 1, wherein the email conversation data structure contains user interface information indicating one or more user preferences for displaying content included in the composite email, and wherein automatically generating the composite email comprises:
  applying the one or more user preferences in the user interface information to the content from the particular email and subset of emails to give rise to a customized display for the composite email.

34. The method of claim 1, wherein the email conversation data structure indicates that a certain email is part of the email conversation, and wherein the method further comprises:
  receiving further user input indicating that the user does not wish to see content from the certain email in the composite email; and
  in response to the further user input, storing a set of indication information in the email conversation data structure to indicate that the certain email should not be accessed in the future, the indication information causing the content from the certain email to not be included in the composite email when the composite email is generated in the future.

35. A non-signal machine readable storage medium having stored thereon instructions, which when executed by one or more processors, cause the one or more processors to perform the method of claim 34.

36. The method of claim 1, further comprising:
  receiving a set of one or more selection criteria from the user, the set of selection criteria indicating which emails in the email conversation the user wishes to see in the composite email; and
  storing the set of selection criteria in the email conversation data structure, wherein the set of selection criteria will be used in the future when generating the composite email to cause only those emails in the email conversation that satisfy the set of selection criteria to be accessed and content extracted therefrom.

37. A non-signal machine readable storage medium having stored thereon instructions, which when executed by one or more processors, cause the one or more processors to perform the method of claim 36.

38. The method of claim 1, further comprising:
  receiving a set of one or more user interface preferences from the user indicating how the user wishes content in the composite email to be displayed; and
  storing the set of user interface preferences in the email conversation, wherein the user interface preferences will be applied to the content included in the composite email when the composite email is generated in the future.

39. The method of claim 1, wherein the authorization information is extracted from a recipient list email that specifies all participants in the email conversation and what each participant can and/or cannot do with respect to the email conversation, and wherein the recipient list email can be sent only by an initiator of the email conversation or by a participant who has been granted authority by the initiator of the email conversation to send recipient list emails.

40. The method of claim 1, wherein a set of participants are participating in the email conversation, and wherein the method further comprises:
  receiving an indication that the user wishes to send a new email in the email conversation;
  composing the new email, wherein the new email has the unique identifier associated therewith;
  sending the new email to the set of participants; and
  updating the email conversation data structure with information pertaining to the new email, thereby causing the email conversation data structure to indicate that the new email is part of the email conversation.

41. The method of claim 40, wherein composing the new email comprises:
  generating a sub-identifier for the new email, the sub-identifier comprising an indication that the user originated the new email and a sequence indicator, wherein the sequence indicator indicates an order in which the new email was sent by the user relative to other emails sent by the user in the email conversation; and
  including the sub-identifier in the new email.

42. The method of claim 41, wherein updating the email conversation data structure comprises:
  storing information obtained from the sub-identifier, including the indication that the user originated the new email and the sequence indicator, into the email conversation data structure.

43. A non-signal machine readable storage medium having stored thereon instructions, which when executed by one or more processors, cause the one or more processors to perform the method of claim 42.

44. The method of claim 40, wherein composing the new email comprises:
  generating a sub-identifier for the new email, the sub-identifier comprising an indication that the user originated the new email, an email type for the new email, and a sequence indicator, wherein the sequence indicator indicates an order in which the new email was sent by the user relative to other emails of the same email type sent by the user in the email conversation; and
  including the sub-identifier in the new email.

45. The method of claim 44, wherein updating the email conversation data structure comprises:
  storing information obtained from the sub-identifier, including the indication that the user originated the new email, the email type for the new email, and the sequence indicator, into the email conversation data structure.

46. The method of claim 1, wherein the particular email or one of the emails in the subset of emails is a markup side mail which includes a set of markup information and an indication that the markup side mail is associated with a certain email that is part of the email conversation, wherein the certain email may be the particular email or one of the emails in the subset of emails, and wherein generating the composite email comprises:
  applying the markup information in the markup side mail to the content from the certain email to show one or more markups made to the certain email by a participant that sent the markup side mail.

47. A non-signal machine readable storage medium having stored thereon instructions, which when executed by one or more processors, cause the one or more processors to perform the method of claim 46.

48. The method of claim 1, further comprising:
  receiving an indication that the user wishes to access a partial archive email that is part of the email conversation, the partial archive email comprising archiving information indicating which emails in the email conversation should be archived;
  accessing the partial archive email;
  processing the archiving information to determine a set of emails to be archived; and
  updating the email conversation data structure to indicate that the set of emails to be archived should not be accessed in the future when the composite email for the email conversation is generated, thereby causing the composite email to no longer include content from the set of emails to be archived.

49. The method of claim 48, further comprising:
  moving the set of emails to be archived to an archive container.

50. A non-signal machine readable storage medium having stored thereon instructions, which when executed by one or more processors, cause the one or more processors to perform the method of claim 48.

51. The method of claim 1, wherein a set of participants are participating in the email conversation, and wherein the method further comprises:
  receiving an indication that the user wishes to access a full archive email that is part of the email conversation, the full archive email indicating that the email conversation should be closed;
  accessing the full archive email; and
  revoking all authorities granted to all of the participants in the email conversation to prevent all participants from sending or receiving any further emails in the email conversation, thereby closing the email conversation.

52. The method of claim 51, further comprising:
  moving all emails in the email conversation to an archive container.

53. A non-signal machine readable storage medium having stored thereon instructions, which when executed by one or more processors, cause the one or more processors to perform the method of claim 51.

54. A non-signal machine readable storage medium having stored thereon instructions, which when executed by one or more processors, cause the one or more processors to perform the method of claim 1.

55. A machine implemented method, comprising:
  receiving input from a user to start a new email conversation, the input comprising a recipient list which specifies the participants who will be participating in the new email conversation, and authorization information indicating what each participant can and/or cannot do with respect to the new email conversation;
  generating a unique identifier for the new email conversation;
  composing a recipient list email, wherein composing comprises:
    including, in the recipient email, the unique identifier, the recipient list, and the authorization information indicating what each participant can and/or cannot do with respect to the new email conversation;
    generating a recipient list sub-identifier for the recipient list email which uniquely identifies the recipient list email within the new email conversation, the recipient list sub-identifier comprising: (a) indication information indicating that it was the user who sent the recipient list email; and (b) a sequence indicator indicating an order in which the recipient list email was sent by the user relative to other emails sent by the user in the new email conversation; and
    including the recipient list sub-identifier in the recipient list email;
  sending the recipient list email to the participants of the new email conversation; and
  updating a new email conversation data structure with information pertaining to the recipient list email including the indication information and the sequence indicator from the recipient list sub-identifier, wherein the new email conversation data structure is associated with the unique identifier and hence, the new email conversation, and wherein the new email conversation data structure stores information pertaining to all emails that are part of the new email conversation;

wherein the method is performed by one or more computing devices.

56. The method of claim 55, wherein the unique identifier comprises information indicating that it was the user who started the new email conversation and a sequence indicator indicating how many email conversations have been started by the user.

57. The method of claim 55, wherein the input from the user further comprises an initial text message, and wherein the method further comprises:
composing a text email, wherein the text email comprises the unique identifier and the initial text message;
sending the text email to the participants of the new email conversation;
updating the new email conversation data structure with information pertaining to the text email.

58. The method of claim 57, wherein composing the text email comprises:
generating a text sub-identifier for the text email which uniquely identifies the text email within the new email conversation, the text sub-identifier comprising: (a) indication information indicating that it was the user who sent the text email; and (b) a sequence indicator indicating an order in which the text email was sent by the user relative to other emails sent by the user in the new email conversation; and
including the text sub-identifier in the text email; and
wherein updating the new email conversation data structure with information pertaining to the text email comprises:
storing at least the indication information and the sequence indicator from the text sub-identifier in the new email conversation data structure.

59. A non-signal machine readable storage medium having stored thereon instructions, which when executed by one or more processors, cause the one or more processors to perform the method of claim 58.

60. The method of claim 57, wherein composing the text email comprises:
generating a text sub-identifier for the text email which uniquely identifies the text email within the new email conversation, the text sub-identifier comprising: (a) an email type for the text email; (b) indication information indicating that it was the user who sent the text email; and (c) a sequence indicator indicating an order in which the text email was sent by the user relative to other emails of the same email type sent by the user in the new email conversation; and
including the text sub-identifier in the text email; and
wherein updating the new email conversation data structure with information pertaining to the text email comprises:
storing at least the email type, the indication information, and the sequence indicator from the text sub-identifier in the new email conversation data structure.

61. The method of claim 57, wherein the input from the user further comprises an overall topic of discussion for the new email conversation and a subheading under the overall topic, and wherein the method further comprises:
composing a subheading email, wherein the subheading email comprises the unique identifier and the subheading under the overall topic;
sending the subheading email to the participants of the new email conversation; and
updating the new email conversation data structure with information pertaining to the subheading email.

62. The method of claim 61,
wherein composing the subheading email comprises:
generating a subheading sub-identifier for the subheading email which uniquely identifies the subheading email within the new email conversation, the subheading sub-identifier comprising: (a) indication information indicating that it was the user who sent the subheading email; and (b) a sequence indicator indicating an order in which the subheading email was sent by the user relative to other emails sent by the user in the new email conversation; and
including the subheading sub-identifier in the subheading email; and
wherein updating the new email conversation data structure with information pertaining to the subheading email comprises:
storing at least the indication information and the sequence indicator from the subheading sub-identifier in the new email conversation data structure.

63. The method of claim 61,
wherein composing the subheading email comprises:
generating a subheading sub-identifier for the subheading email which uniquely identifies the subheading email within the new email conversation, the subheading sub-identifier comprising: (a) an email type for the subheading email; (b) indication information indicating that it was the user who sent the subheading email; and (c) a sequence indicator indicating an order in which the subheading email was sent by the user relative to other emails of the same email type sent by the user in the new email conversation; and
including the subheading sub-identifier in the subheading email; and
wherein updating the new email conversation data structure with information pertaining to the subheading email comprises:
storing at least the email type, the indication information, and the sequence indicator from the subheading sub-identifier in the new email conversation data structure.

64. A non-signal machine readable storage medium having stored thereon instructions, which when executed by one or more processors, cause the one or more processors to perform the method of claim 61.

65. The method of claim 57, wherein the input from the user further comprises information pertaining to one or more attachments to be attached to the new email conversation, and wherein the method further comprises:
composing an attachment email, wherein the attachment email comprises the unique identifier, the information pertaining to the one or more attachments, and the one or more attachments themselves;
sending the attachment email to the participants of the new email conversation; and
updating the new email conversation data structure with information pertaining to the attachment email.

66. The method of claim 65,
wherein composing the attachment email comprises:
generating an attachment sub-identifier for the attachment email which uniquely identifies the attachment email within the new email conversation, the attachment sub-identifier comprising: (a) indication information indicating that it was the user who sent the attachment email; and (b) a sequence indicator indicating an order in which the attachment email was sent by the user relative to other emails sent by the user in the new email conversation; and including the attachment sub-identifier in the attachment email; and wherein updating the new email conversation data structure with information pertaining to the attachment email comprises:

storing at least the indication information and the sequence indicator from the attachment sub-identifier in the new email conversation data structure.

67. The method of claim 65, wherein composing the attachment email comprises:

generating an attachment sub-identifier for the attachment email which uniquely identifies the attachment email within the new email conversation, the attachment sub-identifier comprising: (a) an email type for the attachment email; (b) indication information indicating that it was the user who sent the attachment email; and (c) a sequence indicator indicating an order in which the attachment email was sent by the user relative to other emails of the same email type sent by the user in the new email conversation; and including the attachment sub-identifier in the attachment email; and wherein updating the new email conversation data structure with information pertaining to the attachment email comprises:

storing at least the email type, the indication information, and the sequence indicator from the attachment sub-identifier in the new email conversation data structure.

68. A non-signal machine readable storage medium having stored thereon instructions, which when executed by one or more processors, cause the one or more processors to perform the method of claim 65.

69. The method of claim 55, wherein the recipient list sub-identifier for the recipient list email further comprises an email type for the recipient list email, and wherein the email type for the recipient list email is stored in the new email conversation data structure as part of updating the new email conversation data structure with information pertaining to the recipient list email.

70. A non-signal machine readable storage medium having stored thereon instructions, which when executed by one or more processors, cause the one or more processors to perform the method of claim 55.

* * * * *